(12) United States Patent
Dolgoff

(10) Patent No.: US 7,457,038 B2
(45) Date of Patent: Nov. 25, 2008

(54) OMNIDIRECTIONAL LENTICULAR AND BARRIER-GRID IMAGE DISPLAYS AND METHODS FOR MAKING THEM

(76) Inventor: Gene Dolgoff, 936 Roxbury Dr., Westbury, NY (US) 11590

( * ) Notice: Subject to any disclaimer, the term of this patent is extended or adjusted under 35 U.S.C. 154(b) by 0 days.

(21) Appl. No.: 11/385,972

(22) Filed: Mar. 21, 2006

(65) Prior Publication Data

US 2006/0227427 A1    Oct. 12, 2006

Related U.S. Application Data

(63) Continuation of application No. PCT/US2004/031493, filed on Sep. 22, 2004.

(60) Provisional application No. 60/504,809, filed on Sep. 22, 2003.

(51) Int. Cl.
G02B 27/10 (2006.01)

(52) U.S. Cl. ...................................... 359/619

(58) Field of Classification Search .......... 359/618–626
See application file for complete search history.

(56) References Cited

U.S. PATENT DOCUMENTS 3,409,351 A    11/1968  Winnek
5,330,779 A *   7/1994  Watanabe .................... 426/549
6,373,637 B1    4/2002  Gulick, Jr. et al.
6,437,918 B1 *  8/2002  Hamanaka et al. .......... 359/620
6,504,649 B1 *  1/2003  Myers ......................... 359/454
6,624,946 B2 *  9/2003  Franko, Sr. .................. 359/619
6,831,787 B1 * 12/2004  Scarbrough et al. ......... 359/622
2003/0112523 A1 * 6/2003  Daniell ........................ 359/626
2003/0161047 A1 * 8/2003  Lee et al. ..................... 359/624

\* cited by examiner

*Primary Examiner*—Alicia M Harrington
(74) *Attorney, Agent, or Firm*—Gerry J. Elman; Elman Technology Law, P.C.

(57) ABSTRACT

Image-directing devices, e.g. barriers or lenticular lenses, tilted so as to be other than vertical (zero degrees) or horizontal (ninety degrees), display two or more individual images, each viewable from a different viewing point. Composite images so displayed provide substantially the desired viewing experience regardless of whether their viewing surfaces are tipped about a vertical axis or about a horizontal axis. The composite images are desirably generated from individual images, using novel pixel mapping methods. Lenticular sheets and barrier screens are desirably made with the lenses or barriers oriented at a defined angle to the edge of the sheet.

44 Claims, 16 Drawing Sheets

Image 1 (110)

Image 2 (120)

Image 3 (130)

Composite Image (155)

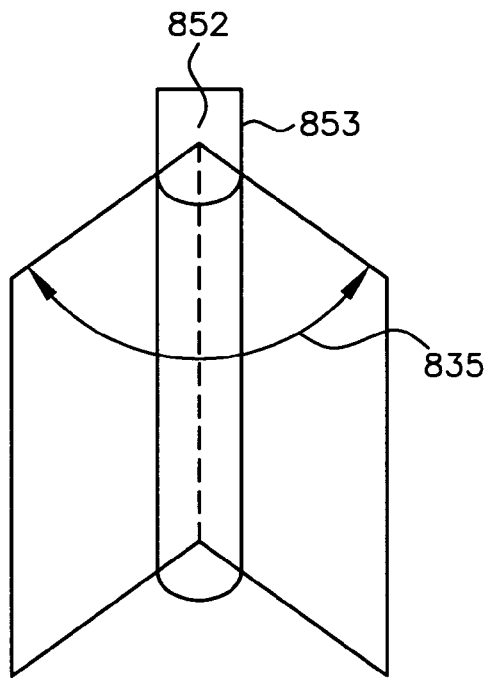
(Prior Art)
FIG. 8B
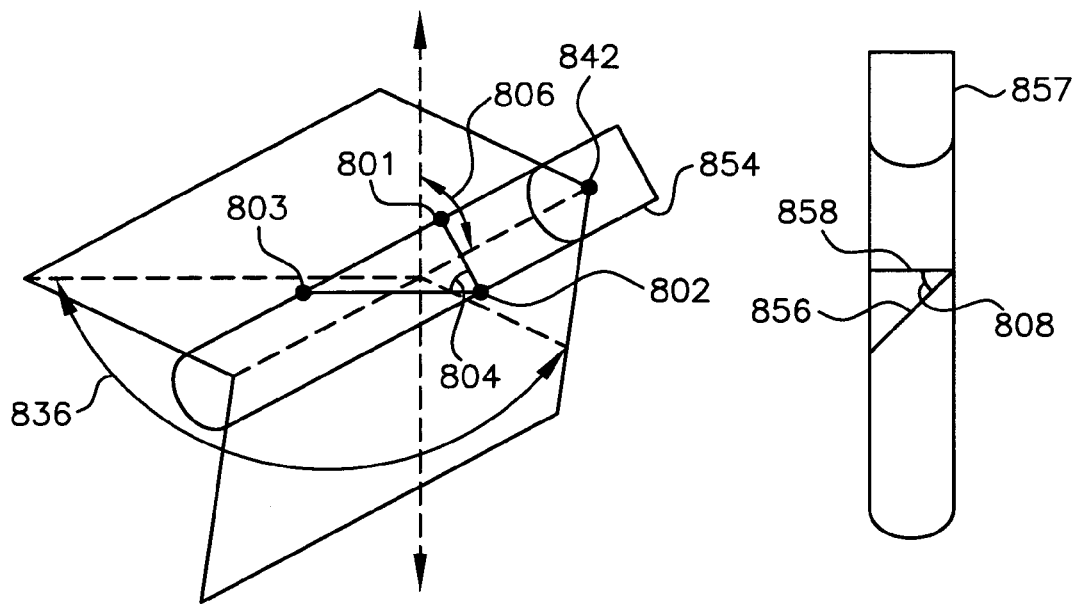
FIG. 8C  FIG. 8D

IMAGE 1 (901)

IMAGE 2 (902)

IMAGE 3 (903)

IMAGE 4 (904)

OMNIDIRECTIONAL LENTICULAR AND BARRIER-GRID IMAGE DISPLAYS AND METHODS FOR MAKING THEM

CROSS REFERENCE TO RELATED APPLICATIONS

This application is a continuation of International Patent Application PCT/US2004/031493, filed Sep. 22, 2004, which claims benefit from U.S. Provisional Patent Application 60/504,809, filed Sep. 22, 2003, The entire contents of the aforementioned patent applications are hereby incorporated by reference.

TECHNICAL FIELD

The present invention relates generally to lenticular and barrier-grid image displays. More specifically, the present invention relates to lenticular and barrier-grid image displays comprising an image medium providing a viewing surface, and an image-directing device, with improved performance by being omnidirectional.

BACKGROUND OF THE INVENTION

Integral and lenticular imaging have been proposed and practiced since the beginning of the $20^{th}$ Century, notably by Lippman, Ives, and others, culminating in 1950 with the work of Victor Anderson, who made lenticular imaging practical and commercialized it. Since then, there has been no fundamental change in the way lenticular images work.

The basic practice has been to select two or more individual images that relate to one another in some way (different views of a 3D scene, different frames of a movie, video, or animation, or just different images on a chosen topic such as a product and its price, before and after pictures, or other images the creator of the picture wants the viewer to see), and to partition the selected individual images into multiple image slices. The image slices, which may be vertical or horizontal slices, are then reassembled back together into one composite image, which is displayed on an image medium providing a viewing surface containing data from each of the individual images. This image medium is overlaid with an image-directing device, e.g. a lenticular screen.

There are two conventional types of image-directing devices, for the purpose of this invention. One type comprises a pattern of vertically- or horizontally-oriented opaque elements, referred to as a barrier screen. Another type of image-directing device comprises an array of cylindrical micro-lenses. This array of cylindrical micro-lenses is referred to as a lenticular screen. The effect of the image-directing device is to make the individual images, which were assembled into the composite image, visible individually, each from a different viewing position.

The use of tilted lenticular lenses has been proposed and implemented in the past for other functions. In U.S. Pat. No. 3,409,351, D. F. Winnek disclosed a methodology for recording a lenticular 3D image in two steps. First a negative is recorded in a camera through a lenticular lens. The individual strip-images recorded behind each of the lenticular lenses are reversed upon passage through the lenticular lens elements. Due to this reversal, viewing the 3D negative provides a pseudoscopic image, wherein depth is reversed. Then, using a projection arrangement similar to that used when enlarging a negative to make a conventional print, the lenticular negative is projected through another lenticular lens onto photographic print material to make a final 3D print. This step allows the final image to be larger, smaller, or the same size as the lenticular negative, as desired, while reversing the strip-images once again to produce an orthoscopic 3D print. The problem created by projecting an image with an inherent vertical line pattern (due to the structure of the first lenticular lens) through another vertical line pattern (the second lenticular lens) is the creation of a noticeable moire pattern. To diminish or visibly eliminate the appearance of this moire pattern, Winnek suggests providing an angle between the axes of the two lenticular lenses. He determines that the angle between the two lenses should be less than 20 degrees to prevent vignetting of the images in the corners.

Use of tilted lenticulars has also been proposed in U.S. Pat. No. 6,373,637 by S. Gullick, Jr. and R. Taylor. This patent teaches the user to take two or more images, rotate them to a tilt angle with respect to the vertical, digitize and multiplex the images vertically, attach them to either a lenticular or a "herringbone lenticular" lens oriented vertically, and then rotate the finished product so that the image is once again vertically oriented, leaving the lenses tilted at the image-tilt-angle minus ninety degrees. Finally, the user is to trim the tilted lens, discarding the unused portions as waste, so that two of its sides are vertical, with the other two sides being horizontal. The technique is proposed so that rotating the finished lenticular about a vertical axis provides a stereoscopic 3D view with parallax, while rotating the finished lenticular about a horizontal axis provides a moving image.

The inventor believes that the prior art nevertheless fails to disclose or suggest means for the production of a composite image display that produces the same perceived effect with various viewing orientations, i.e. whether it is tipped vertically or horizontally, such as is taught herein, nor the methodology to form such a composite image which works with a tilted lenticular or barrier screen, as taught herein, nor the methods of making tilted lenticular lenses or barrier screens, which are also taught herein.

SUMMARY OF INVENTION

The present invention utilizes image-directing devices, e.g. barriers or lenticular lenses, oriented other than vertically (zero degrees) or horizontally (ninety degrees), that is, tilted, to display two or more individual images, each viewable from a different viewing position, i.e., view point. Composite images on an image medium that are displayed in accordance with this invention provide the user with substantially the same viewing experience regardless of whether they are used by causing their surface to tip, e.g. rock back and forth, about a horizontal axis or about a vertical axis, that is, image displays of the present invention can present the desired effect to the viewer when tipping about almost any axis (except one). In another aspect of the invention, a composite image may be displayed with the desired effect by keeping the viewing surface stationary while the viewer moves by, regardless of whether the viewer's movement is in a horizontal or vertical direction, or most any other direction, relative to the viewing surface. It includes approaching or receding from the viewing surface other than at eye level. As a practical matter, any such relative movement by the viewer while the image display remains stationery produces visual effects that are equivalent to tipping the image display while the viewer is stationary. The invention also provides new methods to generate the composite images from individual images, using pixel-mapping methods.

If the image-directing device comprising lenses or barriers is tilted at the preferred angle of forty-five degrees to a horizontal plane, i.e. to the horizon for instance, the desired effect will be seen when the image display is tipped about either the horizontal or the vertical axis, and the speed and extent of the effect will be the same in both tipping directions. In alternative embodiments of the invention, the image-directing device may be tilted at any other angle (other than forty-five, zero, or ninety degrees). However, in such alternative embodiments, the effect will progress more slowly and the extent of the effect will be less when the viewing surface of the display is tipped with respect to the observer in one direction (e.g. vertically, by repeatedly tipping it up and down) than in the other (e.g. horizontally, by repeatedly rocking it left and right), since not all of the original images will necessarily become visible when the viewing surface is tipped in that direction. As a practical matter, the desired effect may be obtained when the angle of tilt is from five degrees to eighty-five degrees, and preferably from fifteen degrees to seventy-five degrees, more preferably from thirty degrees to sixty degrees, even better from forty to fifty degrees, and as previously stated, most preferably at about forty-five degrees.

The present inventor noticed that conventional lenticular and barrier image displays, which do not have their barriers or lenses tilted (that is, they are oriented at zero (vertical) or ninety degrees (horizontal)), produce their effect, such as 3D or motion, even if the image display is tipped about an axis other than zero or ninety degrees, and even if the image display is first rotated about the Z axis an arbitrary amount before tipping about the horizontal (X) or vertical (Y) axis.

Additional benefits of the technique of the present invention are that the viewing angle of this type of image is wider, the "jump" is much less noticeable, ghosting is reduced, alignment of the image with respect to the screen is less critical, and more images can be utilized, for any given display or image resolution and barrier or lens characteristics, as compared to using the same barrier or lens oriented vertically or horizontally, without decreasing the 3D or motion effects generated.

Images can be recorded with the proper arrangement of data with respect to the barrier screen or lenticular lens screen used for viewing by optical or computer means. This method can be utilized with virtually any image medium, including printed images (such as ink jet, litho, screen printing, Lamda, Lightjet, LVT, photographic emulsion, digital imaging, etc.), and electronic images (CRT, LCD, plasma, projection, on a TV, computer, cell phone, front or rear projection screen, etc.). Although conventionally-manufactured image-directing devices such as barrier and lenticular screens can be used with the present invention (though with waste), the present invention optionally but desirably provides for the design and production of special master cylinders or plates to produce the barriers or lenticular screens appropriate for this technique without wasting screen material.

The present invention is able to provide an image display and means for producing it that provides the desired effect of the display regardless of whether its viewing surface (i.e. the viewing surface of its image medium) is tipped about a horizontal, or a vertical, or almost any axis, with respect to the position of the viewer as the viewer watches the display. Utilizing the present invention, there is only one axis which the display can be tipped about that doesn't produce the desired effects. This occurs when tipping the display about the axis which is perpendicular to the orientation of the image-directing elements, which as a practical matter is an unlikely and difficult action for a person to try. As mentioned above, the desired effect is also produced as a viewer moves with respect to a stationary display of the present invention.

A feature of the present invention is the ability to provide an image display and means for producing it that provides a 3D image with horizontal parallax while tipping the picture's viewing surface about a horizontal, or vertical, or almost any axis as the viewer watches.

Another feature of the present invention is the ability to provide an image display and means for producing it that provides a moving image or animation or flip while the display's viewing surface is tipped about a vertical, horizontal, or almost any axis as the viewer watches.

Another feature of the present invention is the ability to provide an image display and means for producing it that provides a moving or animated or flip 3D image while the display's viewing surface is tipped about a horizontal, vertical, or almost any axis as the viewer watches.

Another feature of the present invention is an efficient means for reorganizing data from two or more related images into a composite image which can be viewed through an image-directing device such as a barrier or lenticular screen that makes each original image viewable at a different vantage point from the other images, the image-directing device having its parallel elements oriented at a tilt (by rotation about the z-axis to present them at an angle other than zero or ninety degrees).

Another feature of the present invention is means for producing barrier and lenticular screens whose barriers or cylinder lenses are oriented at an angle other than zero or ninety degrees, which can be used to view a composite image as described herein without wasting barrier or lenticular screen material.

Another feature of the present invention is the ability to provide an image display and means for producing it that provides a wider viewing angle, and thus a diminished perception of an undesirable discontinuity, while maintaining good 3D and motion characteristics and not increasing aberrations or the perception of the barriers or lenses.

Various aspects of the present invention, as will be evident from the detailed disclosure provided below, include:

1. A composite image on an image medium composed of parallel slices of image data, derived from two or more original images, co-mingled to form one image whose slices are not oriented parallel to either the horizontal or vertical axis of the composite image, when it is tipped as intended for viewing, and which is viewable through an image-directing device whose elements are parallel to the direction of the slices of the composite image.
2. A composite image composed of parallel slices, derived from two or more original images, co-mingled to form one image whose slices are not parallel to either the horizontal or vertical axis of the composite image, when it is tipped as intended for viewing, and which is viewed through at least one of a lenticular lens array and a barrier screen whose lenticules and barriers are parallel to the direction of the slices of the composite image, which causes the two or more images to be visible, each from different viewing positions.
3. A composite image composed of parallel slices, derived from two or more original images, co-mingled to form one image whose slices are not parallel to either the horizontal or vertical axis of the composite image, when it is tipped as intended for viewing, and which is viewed through at least one of a lenticular lens array and a barrier screen whose lenticules and barriers are parallel to the direction of the slices of the composite image, which causes the two or more images to be visible, each from different viewing positions, wherein the composite and original images are broken down into sections and sub-sections, and image data from the original image sub-sections is put into selected sub-sections of the composite image according to a set of mapping rules.

4. A composite image composed of parallel slices, derived from two or more original images, co-mingled to form one image whose slices are not oriented parallel or perpendicular to either the horizontal or vertical axes of the composite image, when it is tipped as intended for viewing, and which is viewed through at least one of a lenticular lens array and a barrier screen whose lenticules and barriers are parallel to the direction of the slices of the composite image, which causes the two or more images to be visible, each from different viewing positions, wherein the composite and original images are broken down into sections and sub-sections, and image data from the original image sub-sections is put into selected sub-sections of the composite image according to a set of mapping rules, such that essentially the same sequence of images is displayed to a viewer, regardless of whether the viewing surface of the image medium containing composite image data is tipped relative to a viewer about a horizontal or a vertical axis as the viewer watches.

5. A composite image viewed through at least one of a lenticular lens array and a barrier screen with a viewing angle of at least sixty-five degrees.

6. A barrier screen whose barrier lines are parallel to each other and not parallel to the sides of the substrate the barrier screen is on.

7. A lenticular lens array whose lenslets are parallel to each other and not parallel to the sides of the substrate the lenticular lens array is on.

8. A method of producing a composite image comprising partitioning two or more original images into sections and sub-sections, selecting data from the said sub-sections, rearranging the said selected data into an arrangement forming sections and sub-sections of a new image, wherein the sections and sub-sections are parallel to each other and not parallel or perpendicular to the sides of the composite or original images.

9. A method of producing a composite image comprising partitioning two or more original images into sections and sub-sections, selecting data from the said sub-sections, rearranging the said selected data into an arrangement forming sections and sub-sections of a new image, wherein the sections and sub-sections are parallel to each other and not parallel or perpendicular to the horizontal when displayed to a viewer as intended.

10. A method of producing a cylinder or plate with groves in it that are not parallel to the sides of the cylinder or plate which can be used to produce at least one of a barrier screen and a lenticular lens array.

11. A method to produce a composite image which is to be viewed with an image-directing device, comprising:
   1. Selecting the tilt angle for the barriers or lenticules
   2. Selecting the number of original images to be used
   3. Selecting the composite image size
   4. Selecting the number of barriers or lenticules to use, thereby determining their pitch
   5. Selecting the substrate material for the barrier sheet or lenticular lens array
   6. Selecting the optimum viewing distance
   7. Selecting the thickness of the lenticular lens array or barrier sheet
   8. Selecting the viewing angle of the lenticular lens array or barrier sheet
   9. Determining the Image Data Set width
   10. Rearranging image data from two or more original images into parallel rows or columns according to a pre-determined layout and mapping arrangement utilizing the parameters determined and selected in the aforesaid steps, including the duplication and discarding of pixels as required to preserve the aspect ratio of the composite image, utilizing at least one of computer and optical means.

12. An image display and means for producing it that provides a 3D image with horizontal parallax while rotating the picture about a horizontal or vertical axis as a viewer watches.

13. An image display and means for producing it that provides a moving image or animation or flip while rotating it about a vertical or horizontal axis as a viewer watches.

14. An image display and means for producing it that provides a moving or animated or flip 3D image while rotating it about a horizontal or vertical axis as a viewer watches.

15. An efficient means for reorganizing data from two or more related images into a composite image which can be viewed through a barrier or lenticular screen oriented at an angle other than zero or ninety degrees that makes each original image viewable at a different vantage point from the other images.

16. Means for producing without wasting barrier and lenticular screens whose barriers or cylinder lenses are oriented at an angle other than zero or ninety degrees, which can be used to view a composite image as described herein.

17. A method of making a composite image on an image medium by generating pixels by interpolation rather than by discarding image data.

18. An image and means for producing it that provides a viewing angle of at least 65 degrees, with a diminished perception of "jump," that is, undesired discontinuity, while maintaining good 3D and motion characteristics and not increasing aberrations or the perception of the barriers or lenses.

19. Carrying out the method number 10 above using computer means wherein only the composite image and one original image is in a memory buffer at any one time.

20. Carrying out the method number 10 above using computer means wherein only the composite image and less than all of the lines of data of one original image is in a memory buffer at any one time.

21. Displaying a composite image as disclosed herein electronically.

22. Remapping the image data from two or more original images into a composite image as disclosed herein by optical means.

23. Remapping the image data from two or more original images into a composite image as disclosed herein by optical means wherein the original images are made to overlap onto the composite image such that one selected feature in each original image is made to coincide exactly with each other in the composite image.

24. Remapping the image data from two or more original images into a composite image as disclosed herein by optical means wherein an emulsion is coated on the back of at least one of a barrier screen and a lenticular lens array with the anti-halation layer being the layer furthest from the said one of said screen and array and exposing the emulsion through the said one of said array and screen.

25. Remapping the image data from two or more original images into a composite image as disclosed herein by optical means wherein an emulsion is coated on the back of at least one of a barrier screen and a lenticular lens array with the anti-halation layer being the layer closest to the said one of said screen and array and exposing the emulsion directly and not through the said one of said array and screen.

26. Remapping the image data from two or more original images into a composite image as disclosed herein by optical means wherein the images to be projected are tilted at a selected angle related to the tilt angle of at least one of a lenticular lens array and a barrier screen to be used to view the composite image.

27. Remapping the image data from two or more original images which are made initially at an angle related to the tilt angle of at least one of a lenticular lens array and a barrier screen to be used to view the composite image, into a composite image as disclosed herein by optical means.

28. Remapping the image data from two or more original images into a composite image as disclosed herein by optical means wherein the images are projected through a barrier screen onto an emulsion in registration with a lenticular lens array attached to the emulsion.

29. Remapping the image data from two or more original images into a composite image as disclosed herein by optical means wherein the composite image is contact copied onto an emulsion in registration with an image-directing device attached to the emulsion.

30. Remapping the image data from two or more original images into a composite image as disclosed herein by optical means wherein the barrier screen has clear spaces whose width (Wcl) is less than Pbs/NI.

31. Production of at least one of a lenticular lens screen and a barrier screen by replication from a flat plate that has grooves in it that are not parallel to the sides of the plate.

32. An image-directing device comprising a lenticular screen comprising a substrate having linear boundaries, the substrate being formed into lenticules that are parallel to each other and not parallel to a boundary of the substrate.

33. An image-directing device comprising a barrier screen comprising a substrate having linear boundaries, the substrate having linear openings that are parallel to each other and not parallel to a boundary of the substrate.

34. An image display and means for producing it that provides substantially the same perceived effects whether it is rotated about a horizontal or a vertical axis while a viewer watches.

Definitions

As used herein, an "image-directing device" is a device capable of making visible individually and simultaneously each of a plurality of original images, each original image being visible from a different viewing position, from a composite image comprising a multiplicity of image slices made up of data from the original images. Conventional image-directing devices include lenticular screens and barrier screens.

As used herein, the "desired effect" may include any or a combination of the following visual perceptions, depending on the viewing experience intended and designed into a display by its creator: (a) a three-dimensional ("3D") view with perception of depth and parallax of a depicted scene, (b) motion of any element depicted in the images, (c) flip from one image to another.

As used herein, "tipping" refers to movement of the viewing surface of an image display relative to a viewer. Most such tipping involves movement about a vertical, horizontal or other axis, which movement may be one-time rotation through an arc or back-and-forth reciprocation.

As used herein, "omnidirectional" refers to the capability of an image display having an image-directing device to provide a "desired effect" to a viewer watching the display as it is tipped, regardless of whether the image display is tipped horizontally, vertically or in any other direction, with the exception that tipping about one particular axis (namely an axis perpendicular to the tilt angle) would not provide the desired effect.

As used herein, "lens," "lens element," "micro-lens," "lenslet" and "lenticule" refer interchangeably to an element of a lenticular screen.

As used herein, "tilting" refers to positioning the elements of an image-directing device, or an image display comprising an image-directing device, in an orientation other than horizontal or vertical. The angle of tilt, referred to hereinbelow as Θ, is desirably but not necessarily forty-five degrees from the vertical.

As used herein, "viewing angle" of an image-directing device refers to the angle subtended by an image-directing element that provides an area in space over which data from all original images as described herein can be viewed.

An "original image" is any image chosen to be displayed as one of two or more images on an image display.

A "composite image" is an image derived optically, computationally or otherwise, from data representing two or more original images, the composite image being represented on the viewing surface of an image medium and intended for viewing through an image-directing device.

An "image slice" is data from a portion of an image consisting of a limited amount of data in one direction (as little as one pixel) and all available data from said portion of said image in a generally perpendicular direction referred to herein as a "subsection."

BRIEF DESCRIPTION OF THE DRAWINGS

FIG. 8B is a diagrammatic perspective view of a vertically-oriented lenticule and light rays illustrative of viewing angle 835.

FIG. 8C is a diagrammatic perspective view of a lenticule tilted in accordance with the present invention, showing light rays corresponding generally to those shown in FIG. 8B, with the wider effective viewing angle being shown as angle 836.

FIG. 8D is a diagrammatic perspective view of a lenticule.

DISCLOSURE OF THE INVENTION

Figure 1:
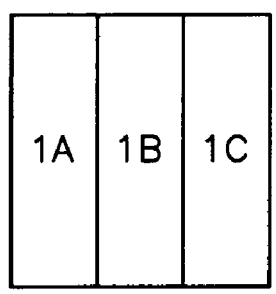
FIG. 1 is a schematic illustration of the general technique of generating a composite image from, for example, three original images.
Figure 1:
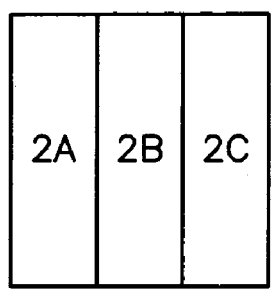
Figure 1:
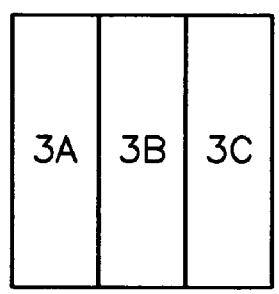
Figure 1:
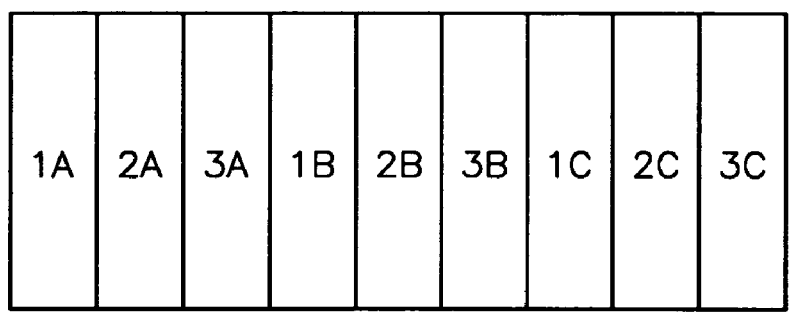

FIG. 1 provides a schematic illustration of the general technique of imaging using image-directing devices such as barrier screens and lenticular screens. As an example of the process, three individual images (110, 120, and 130) are each partitioned into three vertical slices, all of which are re-assembled into one composite image (155). (The number of slices is selected as three to allow the illustration to be easily viewed and understood, but the reader should understand that typically an individual image is partitioned into a large number of slices, the number being related to the number of barriers or micro-lenses with which the composite image is to be used.)

To preserve the aspect ratio of the original images, assuming the composite image has equal resolution in both directions, in accordance with the invention, the original image is expanded in the direction that is parallel to the elements of the image-directing device, e.g. barriers or micro-lenses. Alternatively, as is conventional, data is discarded in the direction perpendicular to that direction before assembling the composite image. The amount of magnification or discarding of data that would be done is a function of how many images are being combined to form the composite image. For instance, in the conventional example shown in FIGS. 2A and 3A, which uses three original images, only one third of the horizontal data would be utilized (discarding two-thirds of the horizontal data).

In a preferred embodiment of the present invention, the height of the final image is expanded by a factor of three (by duplication of pixels or preferably by creating new interpolated pixels). Such an interpolation is conveniently performed by image-processing software such as Adobe Photoshop® using the "image size" function. Although any of the options of nearest-neighbor, bilinear or bicubic sampling, for instance, may be used, the image is preferably re-sampled using bicubic interpolation.

Alternatively, the present invention contemplates that a combination of those two methods might be utilized as well, that is, discarding some data and interpolating other data, to provide image slices of the desired aspect ratio.

Figure 2A:
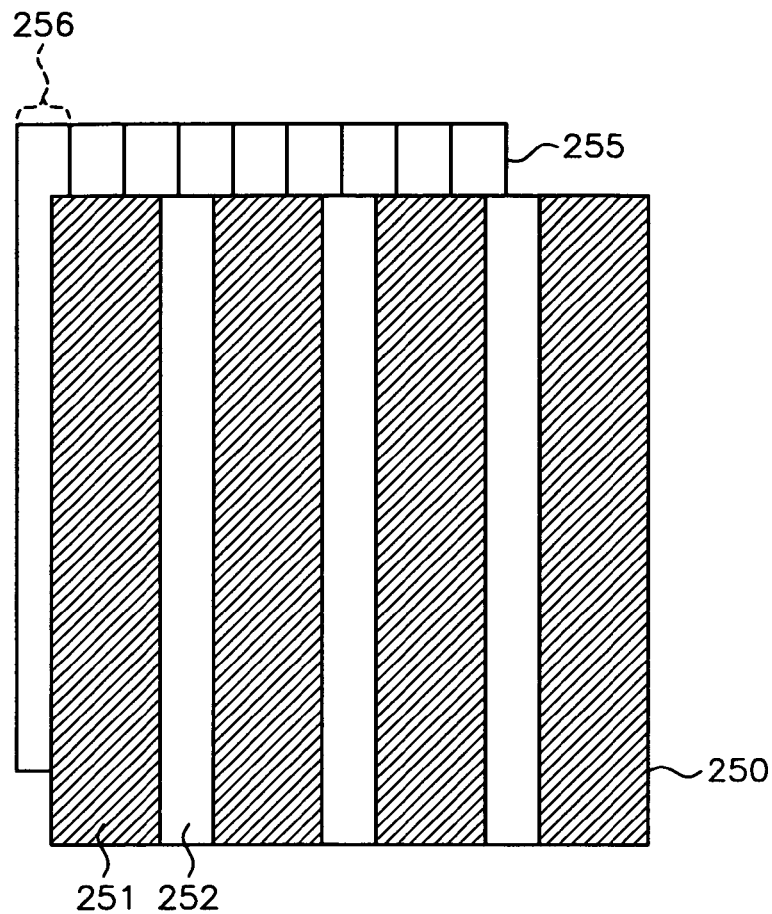
FIG. 2A is a diagrammatic perspective view of an image display comprising a barrier screen in front of an image medium containing data of a composite image generated as shown in FIG. 1.
Figure 2B:
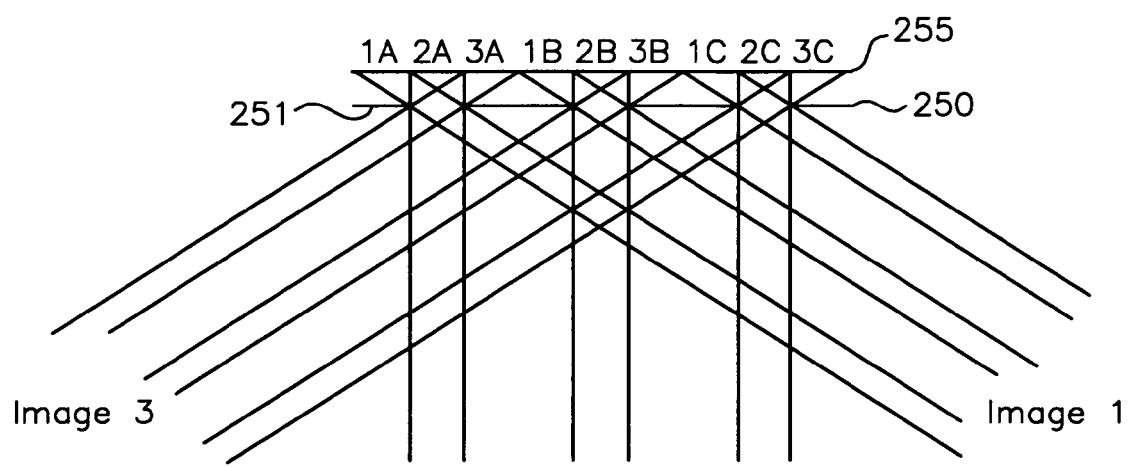
FIG. 2B is a bird's-eye (plan) view of the image display of FIG. 2A, diagrammatically illustrating light rays and the viewing positions from which each of the three images can be observed.

FIG. 2A shows a composite image 255 to be viewed through a barrier screen 250. FIG. 2B shows the same from a bird's-eye (plan) view. Typically, the screen consists of opaque areas 251 and clear areas 252, with each clear area being approximately equal in width to one image slice 256 and each opaque area being approximately equal to the width of one image slice multiplied by the number of original images used minus one.

Figure 3A:
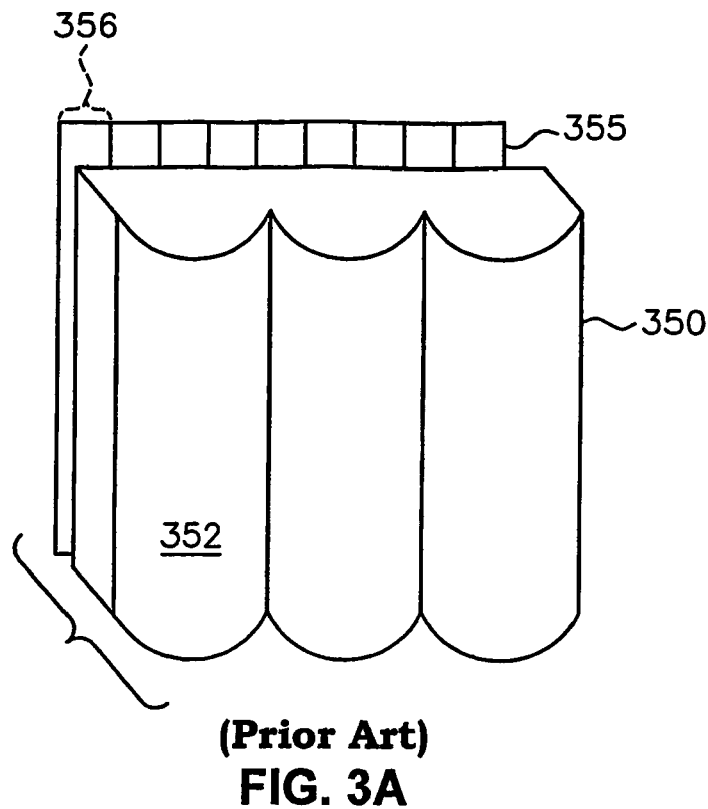
FIG. 3A is a diagrammatic exploded perspective view of an image display comprising a three-lenticule lenticular screen in front of an image medium containing data of a composite image generated as shown in FIG. 1.
Figure 3B:
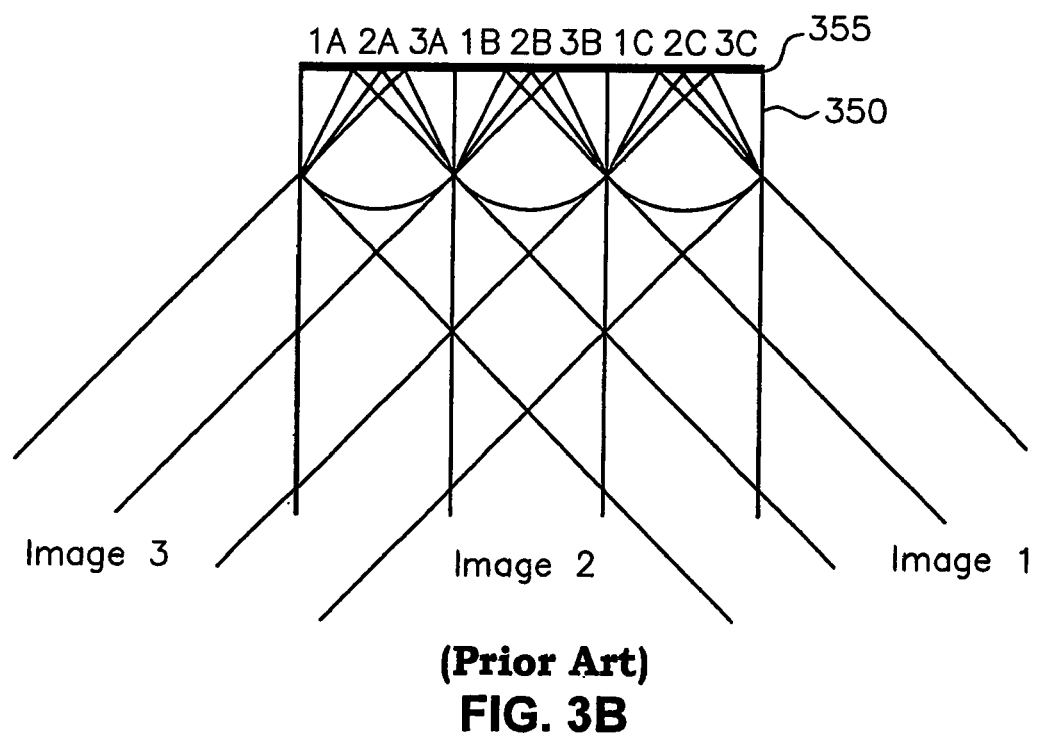
FIG. 3B is a bird's-eye (plan) view of the image display of FIG. 3A, diagrammatically illustrating light rays and the viewing positions from which each of the three original images can be observed.

FIG. 3A shows a perspective view of a composite image on a viewing surface of image medium 355 to be viewed through a lenticular screen 350. FIG. 3B shows the same from a bird's-eye view. Typically, each micro-lens, i.e. lenticule 352, of the lenticular screen covers a space approximately equal to the width of one image slice 356 multiplied by the number of original images used. In both embodiments (FIGS. 2A, 2B and FIGS. 3A, 3B) each of the three original images (Image 1, Image 2, Image 3) is visible separately, each from viewing points at different positions and thus from a different angle with respect to the viewing surface.

The advantages of using a lenticular screen compared to using a barrier screen are that almost all of the light coming from the image passes through the lenses to the viewer, allowing for a bright image, and each lens magnifies the section of the image behind it so that, from any of the viewing angles, the picture looks solid and continuous, with the sections appearing contiguous. The disadvantage is that lenses produce aberrations, causing ghosting, or unwanted overlap of images, limiting depth. The advantages of the barrier screen are somewhat the opposite, producing almost no aberrations (except for some relatively minor diffraction), and thus being able to provide much depth capacity, while producing clearly visible lines between sections, creating an annoying picket-fence effect. Since most light is absorbed by the barriers, the image appears much dimmer than a regular printed image or one using a lenticular lens screen, unless very strong back-lighting is used, consuming additional energy and creating additional heat.

As is well known in the art of producing such displays, if the barriers or lenses are oriented vertically, the different individual images are visible from different horizontal viewing positions. If the individual user, i.e. the viewer, moves up and down relative to the viewing surface, there will be no perceived change. This is a way to show a "flip" image, in which the image appears to flip from a first scene to a second scene, such as a model wearing a certain outfit which flips to the logo of the manufacturer of the outfit. Initially, both eyes of the viewer will see the first image of the flip pair. At some point, as the viewer moves horizontally (or as the viewer tips the image display about a vertical axis) the viewer will move into a position where one eye sees the first image of the flip pair while the other eye sees the second image of the flip pair. Since these images are quite different, the brain can't merge them, creating an unpleasant, confusing experience at that point. As the viewer keeps moving horizontally, however, the viewer will pass that point and reach a position where both eyes see the second image of the flip pair, which will again be pleasant. Even though most viewing positions allow both eyes of the viewer at any given time to simultaneously see one image or the other of the flip pair, and the confusing area is narrow, some viewers are so bothered by the brief confusion that they say the picture makes them dizzy and they dislike the picture altogether.

Moving images (including animations, zooms, and morphs) are worse with vertically-oriented barriers or lenses as compared to horizontally-oriented ones. This is due to the fact that, for any given viewing position, one eye sees the scene depicted at one point in time while the other eye sees the scene depicted at another point in time. The more motion that has taken place between these times, the more different the images will be, and the more difficult (bordering on impossible) it will be to merge these images in the brain, and thus the more disturbing and confusing the experience will be. For this reason, motion images are generally not shown using vertically-oriented barriers or lenses.

Up to now, using vertically-oriented barriers or lenses has generally been considered to be the only way to display a 3D image of a scene. To properly show the 3D image, the different individual images that make up the composite image generally show the 3D scene from different viewing positions which, in the case of photographs, would be the respective camera positions used for taking the original image pictures. The relationship between the width of the image slices, the width of the clear and opaque lines of the barrier screen, or the width of the cylinder lenses of the lenticular screen and the curvature of the lenses, the distance between the viewing surface and the plane of the image-directing device, e.g. a barrier screen or lenticular screen, and the distance between the viewer and the barrier or lenticular screen are carefully chosen so that the two eyes of the viewer will each see a different image at any one time. If each eye of the viewer sees a different image simultaneously, the viewer can perceive a 3D view of the scene. If the viewer's head moves in a horizontal direction, each eye can see a new view of the scene it didn't see before, creating the experience of looking around the scene, called "parallax." In this case, hidden background objects, previously blocked by foreground objects, come into view.

Using horizontally-oriented barriers or lenses has generally been considered the best way to display flips and moving images. This is because, at any given time, both eyes see the same image, creating comfortable viewing at all times. The different individual images are visible from different vertical viewing positions. If the viewer moves horizontally, no switch to another individual image will be perceived. To view different images requires the composite image to be tipped about a horizontal axis or the viewer to move up and down relative to the viewing surface to see the desired effect. If the image is hand-held, this is easy for the user to do. If the image display is stationary, as would be the case, for instance, with a poster mounted on a stationary wall, this would be automatic if the poster is viewed while walking stairs, riding an escalator, or riding an elevator and viewing the poster through a window.

Alternatively, if the poster is mounted at a height other than eye-level, the effect (of viewing different original images) will be observed as the viewer moves toward or away from the poster. If the poster is mounted at eye level, however, the effect would only be obtained if the viewer moves up or down, which is an un-natural movement. Since both eyes always see the same image at any given time, a horizontal orientation of barriers or lenses cannot be used to give the viewer a 3D experience (unless the viewer's head is oriented at a slant, i.e. cocked, or the viewer is in a lying-down position such as might be done in a thrill ride but is otherwise unusual).

This means that a conventional mounted poster that is intended to be viewed by a casual observer from stairs, an escalator, an elevator, or by walking up to it cannot be 3D. It also means that a flip or motion image that is mounted so that people will see it as they walk or drive by, will be annoying to some people.

Another problem arises with hand-held images using barriers or lenticular lenses, regardless of which direction they are tipped to view the desired effect. Since a conventional lenticular or barrier image has its barriers or lenses oriented either horizontally or vertically, there is potentially a 50/50 chance that the viewer will rotate the picture about the wrong axis and fail to see a change or special effect. This will mislead viewers into thinking they are looking at a conventional picture, and they might well put it down and move on, missing the potentially exciting, eye-catching effects available had picture tipping been done in the right way. If, for example, a lenticular image were included in a special promotional mailing, the additional cost to provide the lenticular image is potentially 50% wasted, implicitly doubling the extra cost of the special promotion as to those recipients that see the desired effect, because for hypothetically half of the recipients of the promotion, the visual impact would be indistinguishable from that of an ordinary flat print.

Whether barriers or micro-lenses are used, another disadvantage of the prior art is an undesired discontinuity, sometimes referred to as a "jump." This undesired discontinuity is seen as viewers tip the image display beyond the viewing angle of the image-directing screens, which is typically 25-50 degrees (depending on the configuration of image information and barriers or micro-lenses used). The viewing angle determines the amount of relative movement between a viewer and the viewing surface of the image display to view all the original images. When a viewer moving with respect to the viewing surface has seen all of the images, he then perceives a "jump" as the first of the set of original images is presented following the last member of the same set of original images previously displayed. The undesired discontinuity is very annoying, interfering with the real and natural viewing experience afforded by the image prior to encountering the undesired discontinuity. The narrower the viewing angle is, the more disruptive the undesired discontinuity appears to be, since it occurs with less movement as the viewer attempts to see the image from different positions. It would seem, then, that the solution would be to use lenses or barriers with the largest possible viewing angle.

However, there is a limit to how much the viewing angle can be increased with conventional technology, and increasing the viewing angle creates other problems. This angle-of-view limitation results from the interaction of various factors, such as the limited resolution available from existing printing devices, the maximum acceptable distance between perceived original images at the viewing distance in such a composite image, especially for the production of 3D, and, when using micro-lenses, the increase in aberrations as a lens's F-number (hereinafter "F#") decreases, and the minimum F# a lens can be made with, while still producing an acceptable level of aberrations. It is known that, other things being equal, one may reduce the aberrations (and thus, the perceived ghosting) by using micro-lenses having a higher F#. However, this decreases the viewing angle, making the undesirable discontinuity more noticeable. Conversely, reducing the F# and thereby increasing the viewing angle not only increases aberrations, but also reduces the perceived effect produced. Due to resolution limitations, there is an upper limit to the number of original image slices that can be put under the space between barriers or under a micro-lens, for a given barrier or micro-lens pitch. Therefore, as the viewing angle increases, while the number of images doesn't, the potential 3D experience or extent of motion decreases or else the image will look very jerky with a limited number of images if the difference between them is great. It is, therefore, generally accepted in the field that production of good 3D requires the use of a lens or barrier with a narrow viewing angle, making the undesirable discontinuity unavoidable.

The present inventor has found that conventional lenticular and barrier images, which have the elements of their image-directing devices, i.e. their barriers or lenses, oriented at zero degrees (vertical) or ninety degrees (horizontal), produce their effect, such as 3D or motion, even if the image display is tipped about an axis other than zero or ninety degrees, and even if the image is first rotated about the Z axis an arbitrary amount before tipping about the horizontal (X) or vertical (Y) axis.

Figure 4:
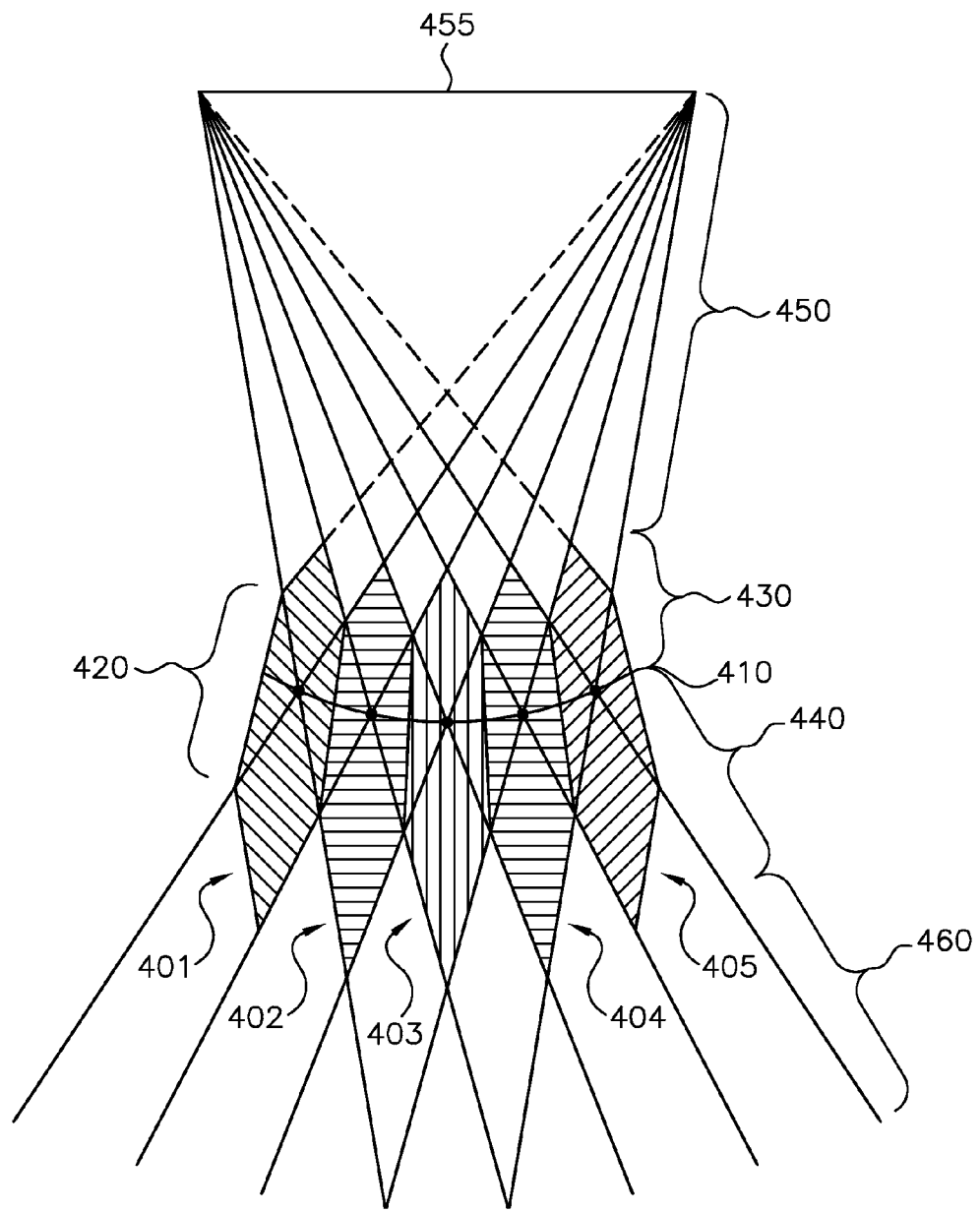
FIG. 4 is a diagrammatic plan view of an image display of the prior art, showing a composite image on an image medium and five viewing zones from each of which a different original image can be observed.
Figure 5A:
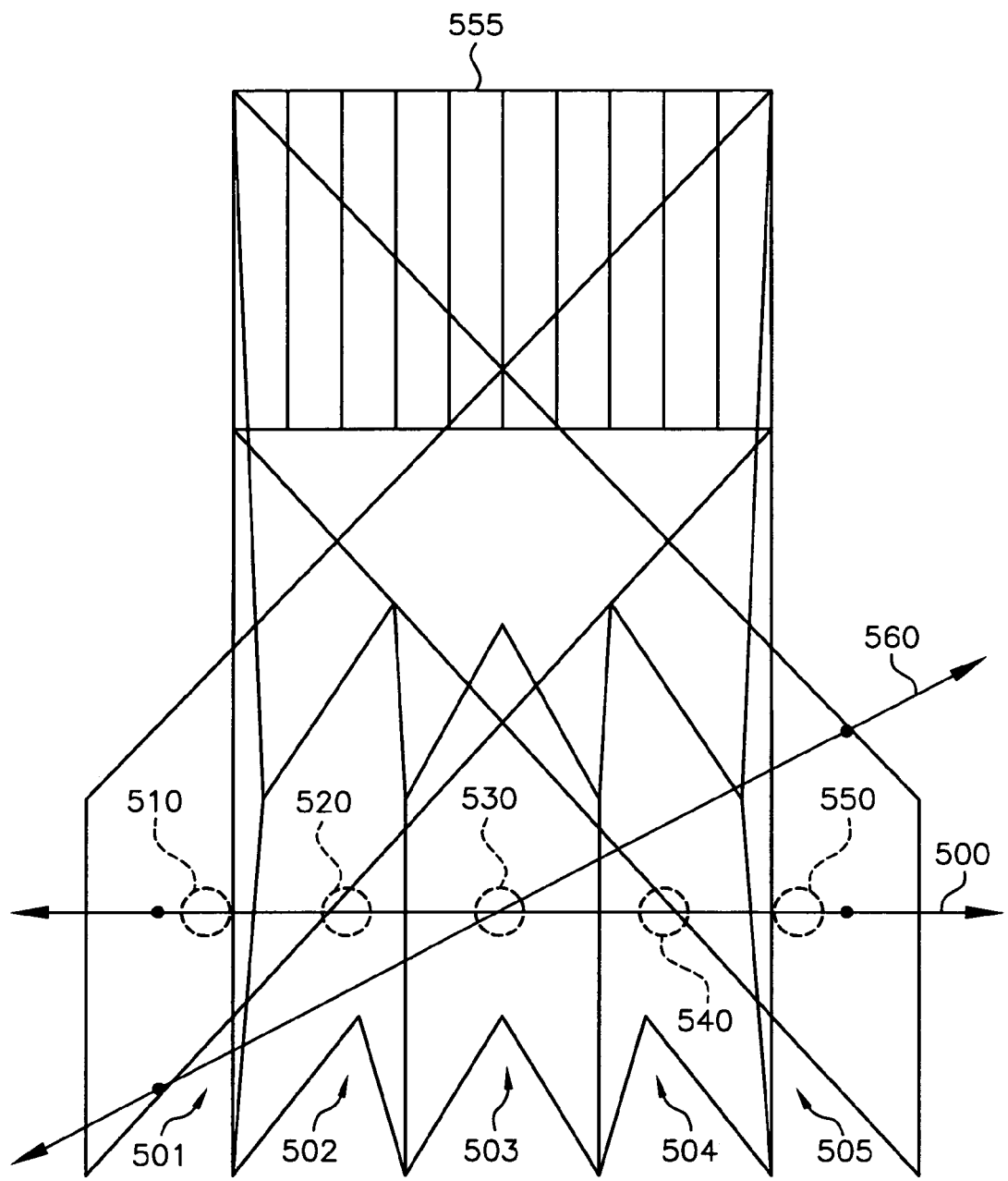
FIG. 5A is a perspective view of FIG. 4.
Figure 5B:
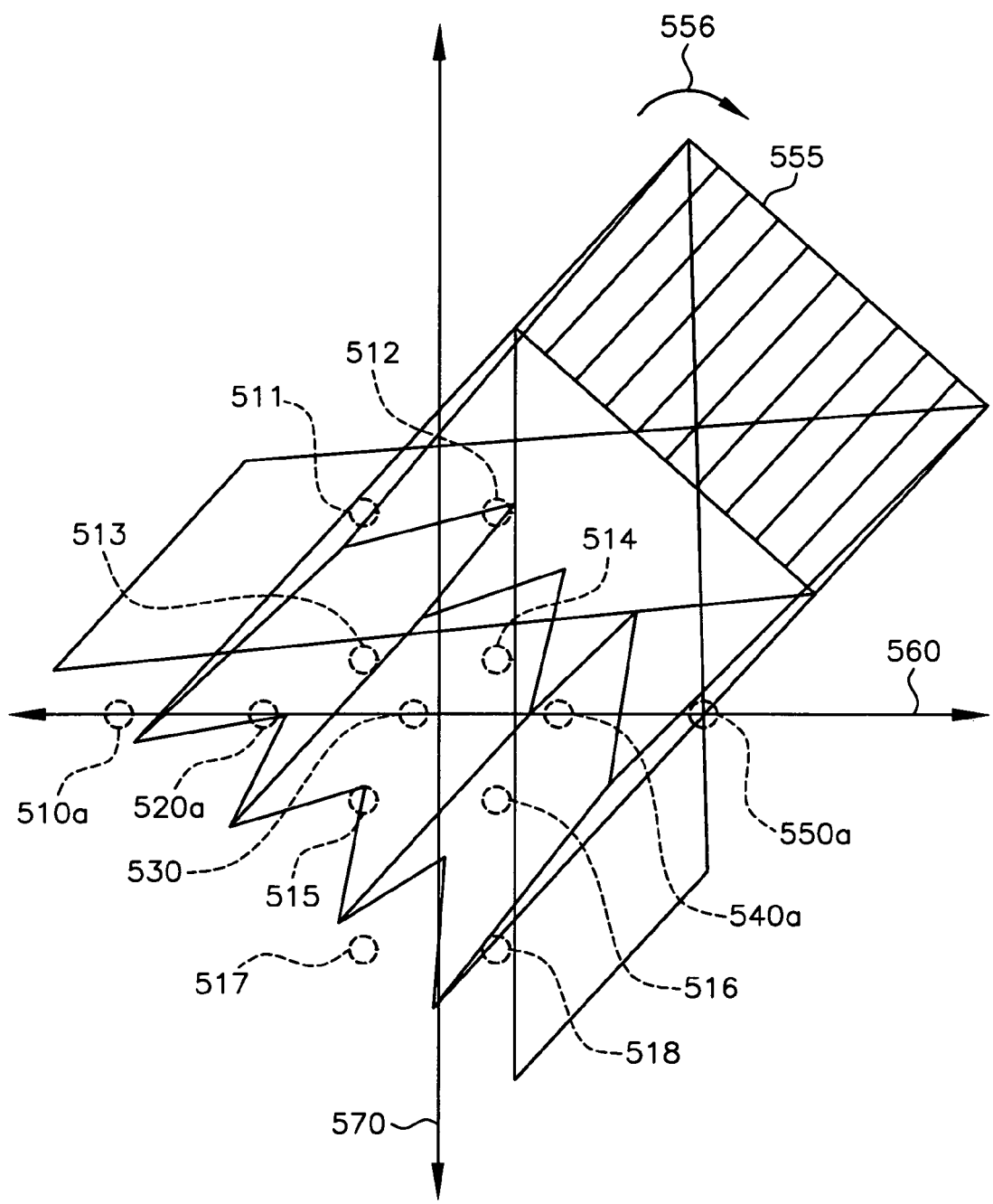
FIG. 5B is a perspective view similar to that of FIG. 5A, wherein the slices of the composite image and elements of the image-directing device are tilted in accordance with the present invention, showing that the viewing zones are correspondingly tilted.
Figure 6:
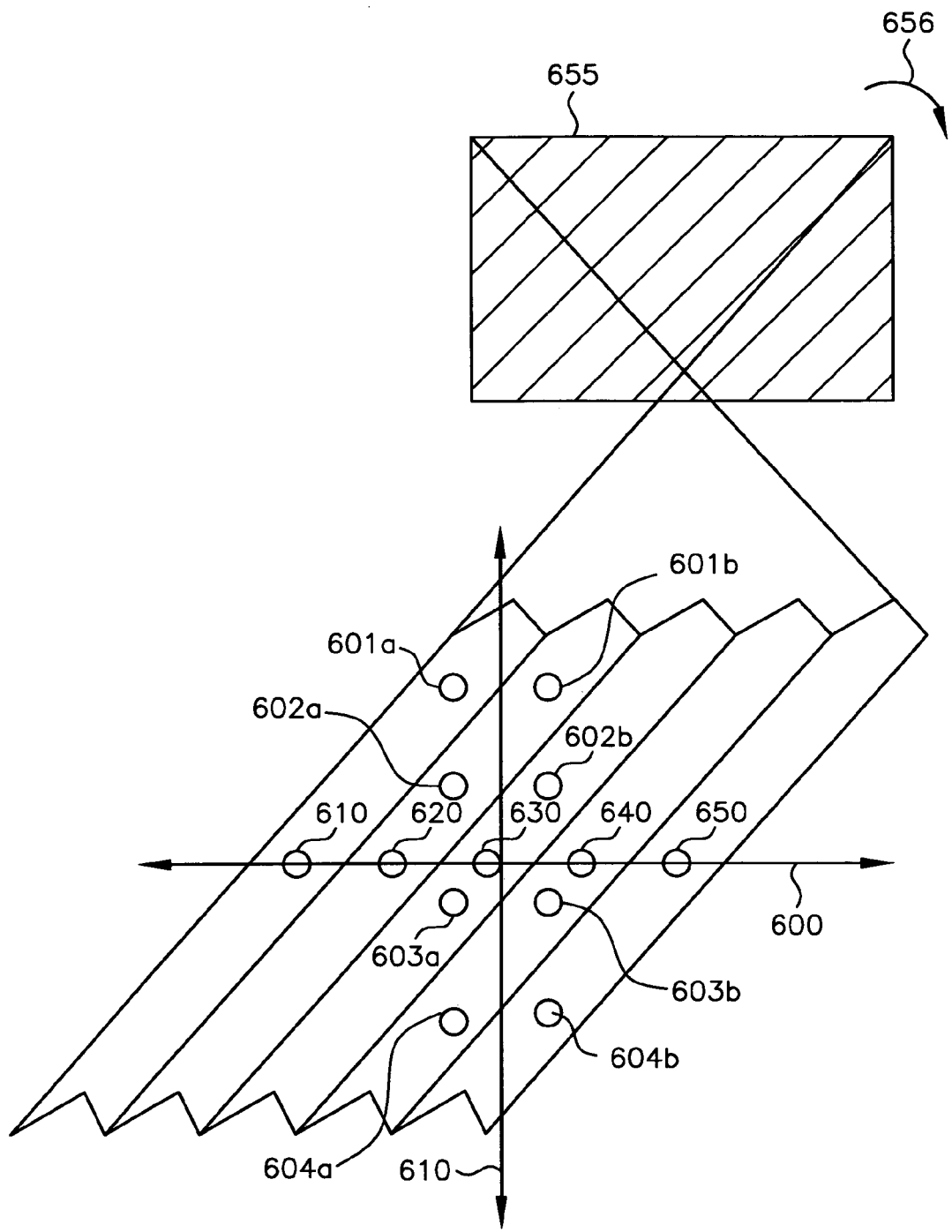
FIG. 6 is a perspective view similar to that of FIG. 5B, showing a preferred embodiment of the present invention.

Analysis of the space in front of the image revealed to the inventor why this was so. FIGS. 4 to 6 show an image medium (455 in FIG. 4, 555 in FIG. 5 and 655 in FIG. 6) that displays a composite image made up of five original images. Virtually any number of images could be used with similar results, but five is used here as an example for simplicity of discussion. The five separate viewing zones where the five images are individually viewable are shown in FIG. 4, which is a bird's-eye view, as shaded areas 401,402,403,404,405 (which are also indicated as shaded areas labeled 420, 430 and 440). Each original image is optimally viewed from among the dotted positions along line 410. The light and image information coming from each lens is approximately collimated. Along line 410, within each viewing zone, image information from each lens overlaps so that an eye placed there will see data from each lens corresponding to a different slice of a single original image. Since the light isn't actually perfectly collimated, due to lens aberrations, non-zero width of each column of image data points or pixels, and imprecise image data placement (data should ideally be at F, the focus of each lens), the area of visibility of each image spreads (horizontally in this case) as indicated by area 420. This causes some overlap of images, creating ghosting and reducing image clarity.

A viewer's eye placed in any of the shaded areas labeled 430 and 440 will also provide a view of mostly a single image in each zone, which will appear to fill the entire viewing surface of image medium 455. Varying degrees of 3D can also be seen from pairs of viewing points in areas 450 and 460. Illustrating this arrangement from a perspective view, FIG. 5 shows the viewing areas depicted in the shaded areas 440 of FIG. 4 as 501,502,503,504,505. Normal viewing is done, for instance, from each of the viewing positions 510,520,530, 540,550, each being a position at some particular time of a single eye of a viewer.

Four viewing locations are shown for the pair of eyes of a viewer: 510/520, 520/530, 530/540, and 540/550. As the eyes move along path 500, each eye sees a different image at any given time, creating the perception of 3D. The present inventor found that as the eyes move along diagonal path 560 in FIG. 5A, similarly they each see a different image at each viewing position, and thus, the desired effect of 3D is still seen, and noticed that this is equivalent to rotating the composite image on the Z-axis and viewing along a horizontal line 560, as shown in FIG. 5B.

As the viewer moves along a vertical line 570, a constantly changing 3D image is seen by the viewer's two eyes in each viewing location 511, 512 to 517,518, the same as when the eyes move on a horizontal line 560. That is, in a first location, the viewer's left eye is at viewing position 511 and the right eye is at 512. In a second location, the viewer's left eye is at 513 and the right eye is at 514, and so on through the third and fourth locations illustrated. Although rotating the image about the Z-axis in this way provides an equivalent viewing experience whether moving along a horizontal or vertical line, the disadvantages created are that the imagery is tilted and the picture's frame or "canvas" is now diamond-shaped rather than being shaped in the more conventional square or rectangular shape.

These drawbacks are eliminated by the present invention, wherein the imagery, and the square or rectangular image medium, or canvas it is on, aren't rotated about the Z-axis, but the image-directing device is. FIG. 6 shows an image display of the present invention and viewing zones similar to those shown in FIG. 5B. An image medium 655 has a viewing surface viewed through an image-directing device having its elements tilted as represented by arrow 656. As a viewer moves along a vertical line 610, a constantly changing 3D image is seen by the viewer's two eyes, substantially the same effect as when the eyes move on a horizontal line 600. That is, in a first viewing location the viewer's left eye is at position 601a and the right eye is at position 601b. In a second location, the viewer's left eye is at position 602a and the right eye is at position 602b, and so on through the third and fourth locations illustrated.

The present invention involves a new way to assemble the individual images into a composite image wherein the images are not rotated, but the data is composited so as to match the tilted orientation of the barriers or cylinder lenses in the image-directing device and thereby produce the desired effect regardless of whether the viewing surface of the image medium is tipped with respect to the viewer about a vertical or horizontal axis during viewing. To assemble the composite image, several steps are typically performed in accordance with the invention. First, the tilt angle of the barriers or cylinder lenses with respect to the vertical (or the horizontal) is selected. This will determine the speed and extent of the effect in each rotation direction (about the horizontal and vertical axes). With the lenses or barriers at forty-five degrees, the speed and extent of the effect will be the same whether the image is tipped about the horizontal or the vertical axis. If the selected lens or barrier tilt angle is closer to zero (assumed to be vertical for this explanation), the speed and extent of the effect is greater when the image surface is tipped about the vertical axis, and it is lower when it is tipped about the horizontal axis. Conversely, the speed and extent of the effect is lower when tipping about the vertical axis and higher when tipping about the horizontal axis, as the selected tilt angle gets closer to ninety degrees (assumed to be horizontal for this explanation). In the extreme cases of zero and ninety degrees, the speed and extent is at the maximum in one direction and is zero in the other direction.

Figure 7:
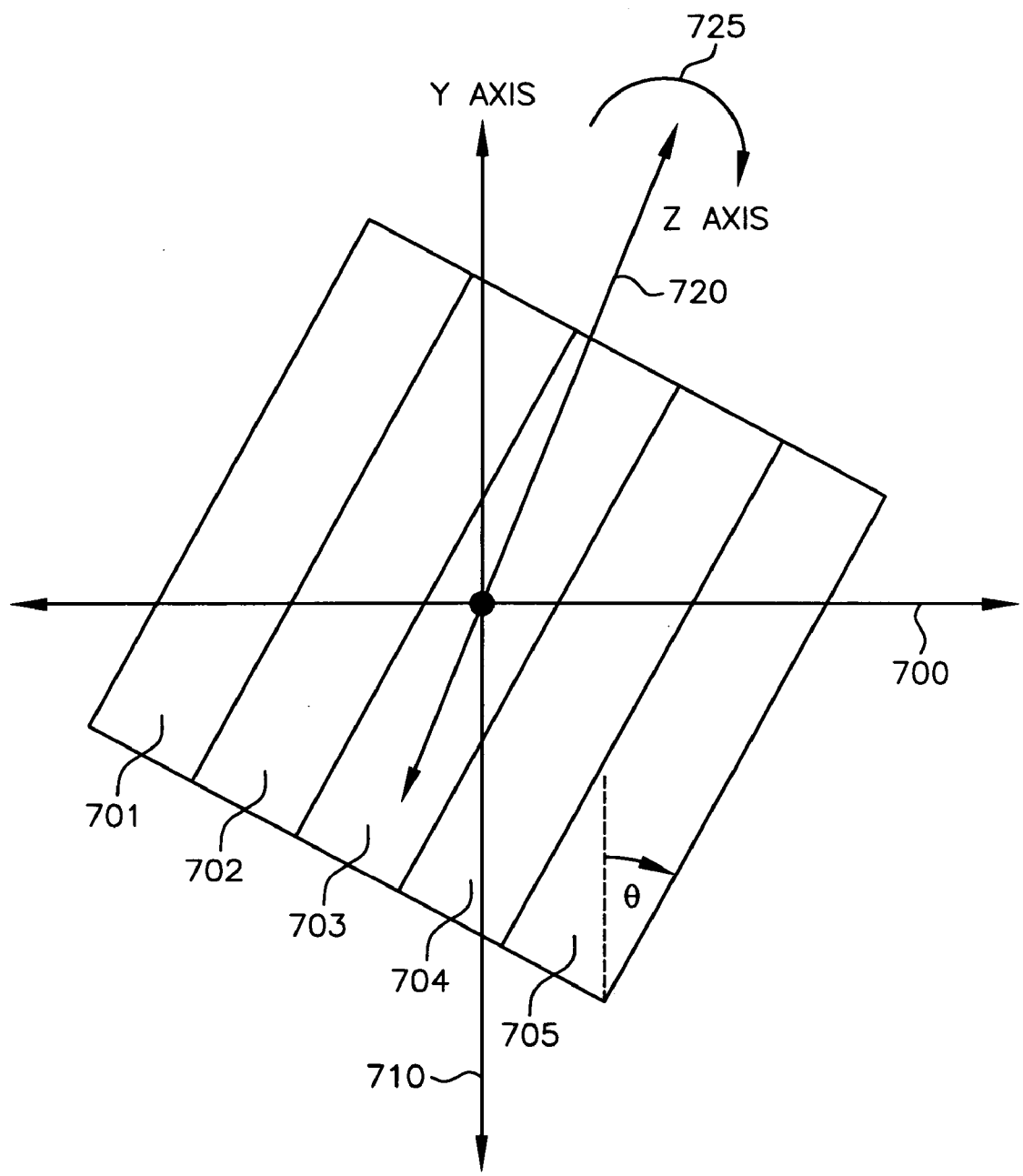
FIG. 7 is a perspective view showing diagrammatically a plane through the five viewing zones depicted in FIG. 5B, wherein the tilt angle Θ is other than forty-five degrees.

FIG. 7 shows this visually. The five viewing zones depicted, for instance, as 401 to 405 in FIG. 4 are shown in a straight-on elevational view as 701,702,703,704,705. Thus, Image 1 is seen in zone 701, Image 2 is seen in zone 702, Image 3 is seen in zone 703, Image 4 seen in zone 704, and Image 5 is seen in zone 705. The lenses or barriers (and hence the viewing zones) are shown tilted, that is, rotated 725 about the Z-axis an arbitrary angle $\Theta$, which in this particular example is not zero, forty-five or ninety degrees. Thus FIG. 7 exemplifies the acceptable but not optimal effect obtained when the tilt angle is other than forty-five degrees. In accordance with the invention, the image data would be configured so it can be seen properly through the tilted image-directing device. Moving one's eyes along line 700 produces an image that, except for its tilt, behaves approximately the same as it would if the angle Θ was zero. The viewer's eyes see each image, one at a time, as they move along line 700 for the entire distance necessary to see all images. However, in this illustration, moving vertically along line 710 allows the viewer to see only images in viewing zones 702 to 704 (images in viewing zones 701 and 705 are never visible, inasmuch as line 710 does not traverse those viewing zones). These three images are seen over the same viewing angle that images 1 to 5 are seen when viewing along line 700. Thus, all other things being equal, each of the three original images is visible for a longer time (that is over a greater angular distance) than it would have been if a conventional display (e.g. as shown in FIG. 3A) were used, slowing down the observed effect in that direction. Since fewer images are seen as the viewer traverses the same viewing angle, moving from one vantage point to another, the extent of the effect is also reduced.

In accordance with the present invention, in addition to selecting the tilt angle, the number of images to be combined into the final composite image is chosen. The choices regarding the lens or barrier pitch and the number of original images to be used are limited by the resolution of the image medium and by personal preference regarding image quality, much the same way such decisions are made when producing conventional barrier or lenticular images. Use of too few images causes the appearance of jumping or minimally noticeable effects (depending on the extent of the difference between images) when moving from one image to the next. Use of too many images causes ghosting as multiple images are seen at once. A typical number is from five to twenty original images, depending on the angle of view from one extreme vantage point to another and, if lenses are used, depending on the severity of aberrations. The number of images used determines the number of image slices that are to be placed under each lens or barrier in the composite image and the number of image slices that each section of each original image is to be broken down into.

Next the number of barriers or lenses to be used to view the composite image is determined. This depends on the chosen size of the final composite image (in inches, for instance) and the choice of pitch of the barriers or lenses (the size of the space, in inches, for instance, between contiguous barriers or lenses, which is the inverse of the number of barriers or lenses, per inch, for instance). The more barriers or lenses (and thus, the smaller the pitch), the less noticeable they are. The number that can be used is limited, however, as stated above, by the number of images chosen to be put into the composite image, and the available resolution (dots per inch, for instance) of the image medium containing data from which each of the various original images is viewed through the image-directing device. The number of original images multiplied by the number of lenses or clear barrier spaces used, per inch, for instance, determines the required resolution. In the composite image, the number of lenses (if a lenticular screen is used) or the number of clear spaces (if a barrier screen is used) to be used determines the number of sections each original image and the composite image are to be broken up into.

As is known by those skilled in the art, there are only a few parameters to select in determining which available material to use for the lenses, e.g. cost, weight, clarity, stability, ease of fabrication, etc. Once the material is chosen, the index of refraction (n), of the lenses is a given. Consequently, whichever lens is available or easiest or least expensive to make, can determine which to use.

Next the optimum viewing distance and the thickness of the screen are selected, and the "Image Data Set" width is determined. The desired optimum viewing distance (d) is first chosen. Although an optimum viewing distance (d) is selected, such as the distance between the image 455 and line 410 in FIG. 4, a viewing zone will be created, such as the areas represented by 420, 430 and 440, wherein the desired image effects will work best. As explained above, a slice from each of the original images will be placed under each lens or barrier space. The barrier space is the space between the beginning of one clear space of a barrier screen and the beginning of the next clear space. The image slices under one lens or barrier space is referred to herein as an "Image Data Set". If the width of an Image Data Set is equal to the width of a lens (or a "barrier space"), then the composite image can be properly seen only at infinity. The closer the desired optimum viewing distance (d) is, the larger the "Image Data Set" width should be under one lens or "barrier space". The width of the Image Data Set (Wids) determines the pitch of the Image Data Sets. There are the same number of lenses (or "barrier spaces") as there are Image Data Sets, although at all viewing distances, except infinity, the lens (or "barrier space") pitch is less than the Image Data Set's pitch.

Figure 8A:
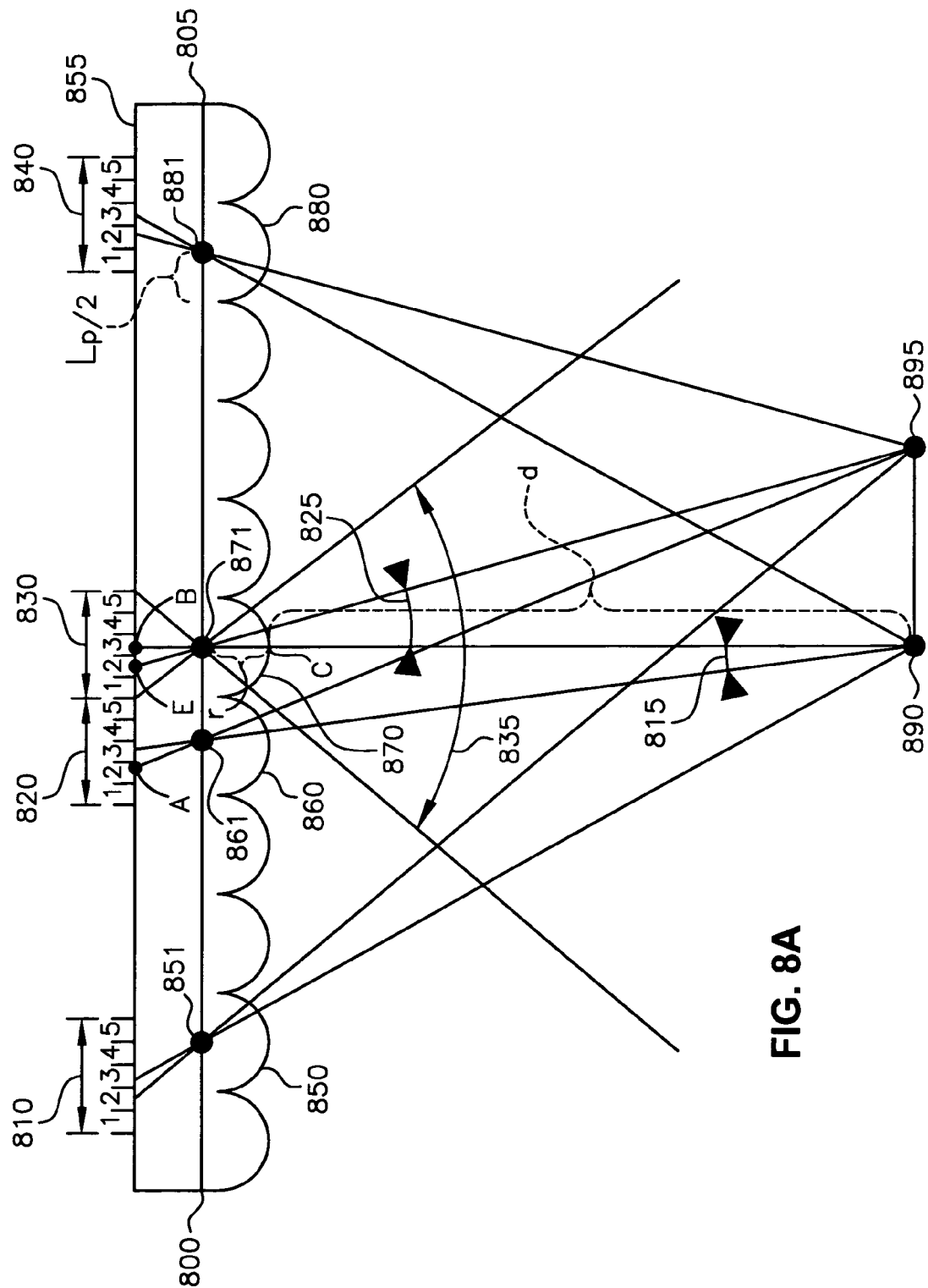
FIG. 8A is a bird's-eye (plan) view of an image display, wherein a lenticular screen is the image-directing device and various dimensions and light rays are shown diagrammatically.

This is explained by referring to FIG. 8A, which is a bird's-eye view of a composite image attached to a lenticular lens 855. Image Data Sets 810, 820, 830 and 840, which are all equal in width, are shown for illustration only, each consisting of 5 sub-sections, indicating 5 original images were used in this example. The centers of curvature of each lens lie along line 800-805. The distance between the center of curvature of, for example, lens 860, indicated by the dot labeled 861, and the center of curvature of adjacent lens 870, indicated by the dot labeled 871, is the lens pitch (Lp) (this is also equal to the distance between the highest points of two adjacent lenses). Points 890 and 895 are two possible viewing positions, each providing a view of a different single image (position 890 provides a view of image 3 while position 895 provides a view of image 2). Knowing the distance between 871 and 890 (d+r) and the lens pitch (Lp) will allow for the calculation of angle 815:

$$\tan(\text{angle 815}) = Lp/(d+r).$$

The distance r is the radius of curvature of the lens, extending from the lens at point C to point 871 (the center of curvature).

To perform this calculation, the radius of curvature (r) is determined. The longer the radius (and, thus the longer the focal length), as compared to the lens width (pitch), the higher is the lens's F number, the narrower is the lens's angle of view, and the less aberrations the lens will have, providing for less ghosting and a sharper image. The F number (F#) of a lens is equal to its focal length divided by its pitch (F#=f/Lp).

The chosen thickness of the lens T1, shown in FIG. 8A as the distance from "B" to "C", can be used to calculate the focal length (f) of the lens: f=T1/n (because we want the lens to focus on its back surface), where n is the index of refreaction of the lens material. The focal length (f) is the distance from the center of curvature, 871, to the focus of the lens, which is placed at the back of the lens at point "B". The standard lensmaker's equation regarding radius of curvature, when used on a plano-convex lens, is:

$$1/f = (n-1)*(1/r).$$

Rearranging, r=1/((1/f)/(n−1)), or simply, r=f(n−1). This allows for the determination of (r), which is the distance between point "C" and point 871 (the lens's center of curvature). The sum of (f) and (r) is also equal to the selected lens thickness (T1). Using angle 815 (calculated as above), the "Image Data Set Width" (Wids) (shown as the space between A and E, which is equal to 810=820=830=840) can be calculated: Wids=(Dt)*(tan(angle 815)), where the total distance (Dt) between the viewing position 890 and the central data slice (sub-section) at point "B", is d+r+f. Since Wids is larger than Lp, Image Data Sets 810 and 840, for instance, are noticeably offset from their respective lenses 850 and 880 as compared to Image Data Sets 820 and 830 with respect to their lenses 860 and 870.

Choice of lens thickness may also be influenced by the desire for a particular viewing angle (VA). The viewing angle (VA), depicted in FIG. 8A as 835, is the angle over which the viewer must move to see all original images that were combined to make the composite image 855 if the lenses are oriented vertically. The viewing angle (VA) can be calculated as follows:

$$VA = 2 \arctan((Wids/2)/f)$$

If the lenses are to be oriented at an angle other than zero degrees (vertically oriented), the viewing angle increases. However, this increased viewing angle doesn't require any change in the other parameters, (i.e. (r), (f), (T1), or (n)), just simply a rotation of the orientation of the lenses. This is illustrated in FIGS. 8B, 8C and 8D. For simplicity of illustration, only one lens element of the lenticular micro-lens array is shown. Element 853 is an example of a lens element vertically oriented. Light passing through the lens's center of curvature 852 passes through the lens's curved surface providing viewing angle 835.

As shown in FIG. 8C, if the lens 854 is tilted at tilt angle Ta, indicated by reference numeral 806, the apparent lens pitch (width) changes from the distance 801-802 (Lp) to the distance 802-803 (parallel to the horizontal X-axis), which is larger than the distance 801-802, increasing the viewing angle to the measure of angle 836 shown in FIG. 8C, which is larger than the measure of angle 835 shown in FIG. 8B. That is, as compared with that of vertical lenticule 853, apparent lens width (alw) 802-803 increases according to:

$$alw = Lp/\cos(Ta).$$

At forty-five degrees, (alw) is approximately 1.41 times Lp. In other words, the width of each lens element, i.e. each lenticule, appears to have increased by about 41%, increasing the viewing angle correspondingly. Thus a lens that exhibits a 50-degree viewing angle when oriented vertically as shown in FIG. 8B behaves, when tilted as shown in FIG. 8C, comparably to a vertical lens with a viewing angle of about 71 degrees. However, since the focal length (f), the actual pitch of the lens (Lp), and actual F# haven't changed, there is no increase in aberrations or in noticeability of the lenses. Having a larger viewing angle makes it much less likely that the undesirable discontinuity will be seen, increasing the realism and pleasantness of the viewing experience. However, if there is a larger viewing angle but the same number of original images is used, each image will be visible over a larger angle, decreasing 3D and speed of movement. If the maximum number of images was already being used, due to the limit of display or printer resolution, it would seem that there would be nothing that could be done about this problem. As shown in FIG. 8D, looking at lens 857, it can be seen, however, that more images can be used without the need for higher resolution. Line 858 represents a row of pixels behind lens 857. Without changing its planar orientation, tilting the lens at an angle 808 (the preferred angle being forty-five degrees) results in the use of the pixels along line 856 for data that would have been present in a horizontal line such as 858 under a lenslet that was not tilted. At forty-five degrees, line 856 is approximately 41% longer than line 858. This means about 41% more pixels are available under the lens and, therefore, as an advantage of the present invention, about 41% more images can be used without the need to increase display or image resolution. The ability of embodiments of the present invention to use more images than corresponding conventional image displays allows the designer of the display to maintain the 3D and motion speeds that are displayed, as if the angle of view were smaller, even though here it is actually larger.

Figure 8E:
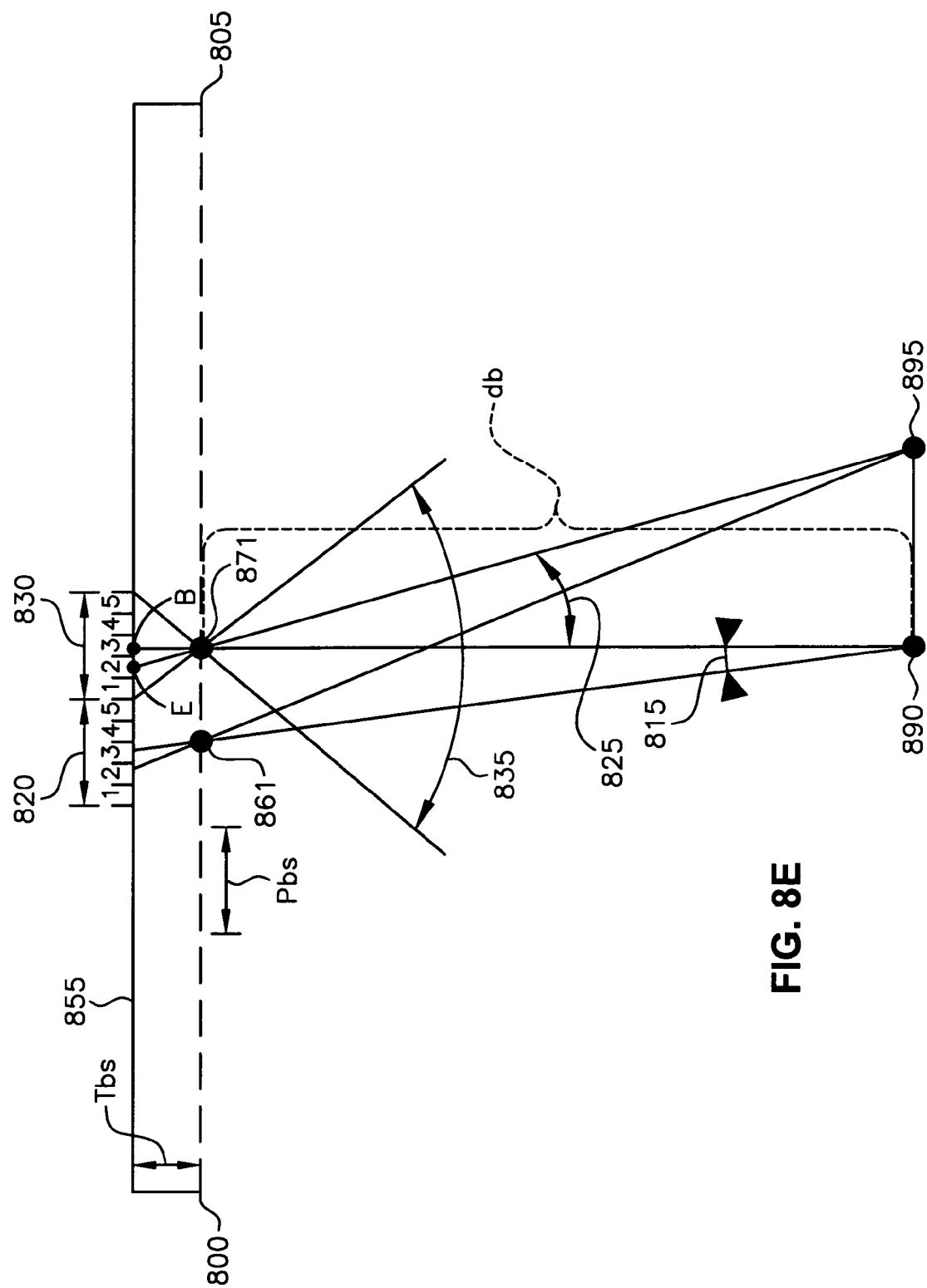
FIG. 8E is a bird's-eye (plan) view of an image display of the present invention, similar to that of FIG. 8A but wherein a barrier screen is the image-directing device.

When using barriers instead of lenses, the barriers would be analogously placed along line 800-805 as shown in FIG. 8A. For clarity of illustration, a corresponding image display but with a barrier screen is shown in FIG. 8E. The clear lines of the barrier screen are spaced apart a chosen distance, the "barrier space pitch" (Pbs), just as are the centers of curvature of each lens as illustrated in FIG. 8A. The distance between point "B" and point 871, which represents the distance between the barriers and the image data, referred to here as the barrier screen thickness (Tbs), is also chosen. This choice may be influenced if a particular viewing angle (VA) is desired. Once the optimum viewing distance (the distance between point 890 and point 871) is also chosen (shown in FIG. 8A as d+r), the Image Data Set Width (Wids) can be calculated. First angle 815 is calculated as before (tan(angle 815)=Pbs/(db)). Then Wids is calculated:

$$Wids = \tan(\text{angle } 815)*(db+Tbs).$$

The viewing angle 835 for vertically oriented barriers is:

$$(VA) = 2\arctan((Wids/2)/Tbs).$$

As can be seen from these three equations, achieving a desired viewing angle simply requires the proper selection of the barrier screen thickness (Tbs), once the viewing distance (db) and the "barrier space" pitch (Pbs) are chosen. The analysis above (relating to the use of lenses) utilizing FIG. 8A applies to the use of barriers also, as shown in FIG. 8E. As the tilt angle of the barriers is increased, the angle of view is increased in the same way as it was with tilted lenses with all the same benefits.

Regardless of whether lenses or barriers are used, once Wids is determined, the optimum viewing distance (db) determines the minimum number of images that can be used and still produce the perception of a three-dimensional view ("3D"). The distance between adjacent viewing positions (890 to 895) is assumed to be 2.5 inches, approximately the distance between two adult eyes. The width of the viewing zone over which a single image can be seen can't exceed that distance or both eyes will see the same image, making the perception of 3D from that viewing position impossible. This allows for the calculation of the angle 825 (when lenses are used) subtended by the largest allowable single image slice (to produce 3D):

$$\tan(\text{angle } 825) = (2.5/(d+r)) \text{ or with the use of barriers,}$$
$$\tan(\text{angle } 825) = (2.5/db).$$

Once this angle is calculated, the maximum width of an image slice (distance from "E" to "B") can be calculated: EB=tan(angle 825)*f) in the case where lenses are used and EB=(tan(angle 825)*(Tbs)) when barriers are used. Dividing Wids by the value of EB (then rounding up to the nearest whole number) gives the minimum number of images that can be used while still producing the perception of 3D for the viewer. The maximum number of images that can be used with a given lens or barrier pitch is limited by the resolution limit of the medium displaying the composite image. This applies to lenses or barriers oriented vertically. If they are tilted at an angle, the size of Wids increases. Consequently, to calculate the minimum number of images required to see 3D from a given viewing position where the lens or barrier is tilted (thus not oriented at 0 degrees) the tilted Wids (Widst) is calculated: Widst=Wids/cos(Ta). Widst is divided by EB and then the result is rounded up to the nearest whole number. Since the cosine of 0 is 1, this works for any angle, including vertical (zero degrees).

The proper Image Data Set Width (Wids) for a selected viewing distance can also be determined experimentally. To do this, a series of long parallel bars (as long as the composite image width, for instance), one above the other, are displayed and viewed through a lens or barrier sheet. Each bar could be about ¼" high, for instance, and be made of alternating black and white slices, which are oriented perpendicular to the bars (when using an image-directing device oriented at zero degrees). The bars should be oriented perpendicular to the lenses or barriers. A black-and-white pair of slices is considered one Image Data Set. Each bar's Image Data Sets are chosen to have a slightly different pitch. For instance, using a lens or "barrier space" with a pitch of 0.01 inches (100 lenses or "barrier spaces" per inch) and a viewing distance of about 18 inches, the pitch of the Image Data Sets in adjacent test bars could be 0.010055, 0.010054, 0.010053, 0.010052, 0.010051, and 0.010050 inches. When viewing the bars through the lens or barrier screen at the selected viewing distance, the bar that has the most appropriate pitch will appear to one eye as all white or all black, depending on viewing position, all along its length. If no bar appears that way along its entire length, the pitch of the bar that comes closest can be used as the basis for a second test. For instance, if the bar with the pitch of 0.010052 appeared closest, the second test could consist of bars with pitches of 0.0100518, 0.0100519, 0.0100520, 0.0100521, 0.0100522, and 0.0100523 inches. Again, the bar that looks most nearly all black or all white determines the best Wids to use.

Figure 9A:
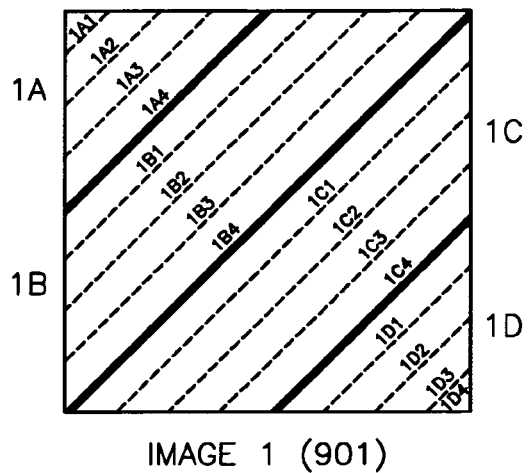
FIGS. 9A through 9D are diagrammatic elevational views of each of four original images illustrating how respective image slices and subsections therefrom are numbered.
Figure 9B:
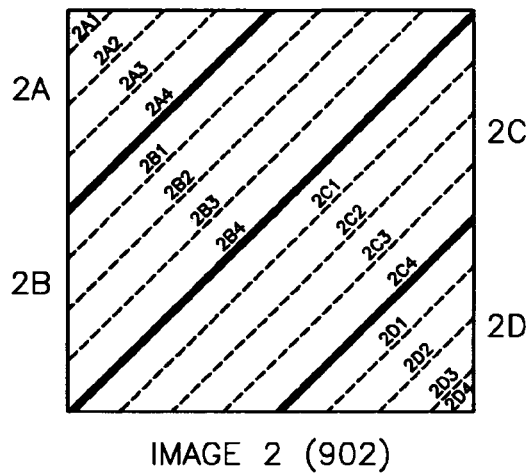
Figure 9C:
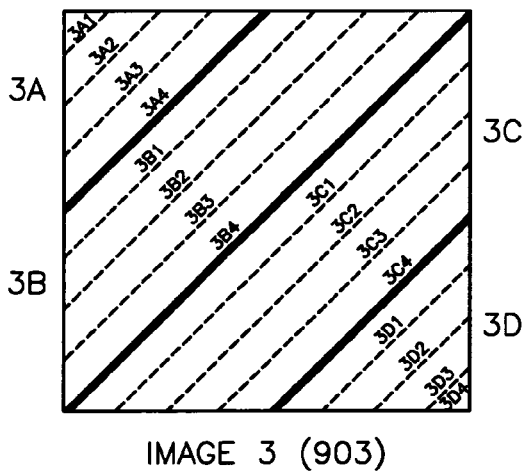
Figure 9D:
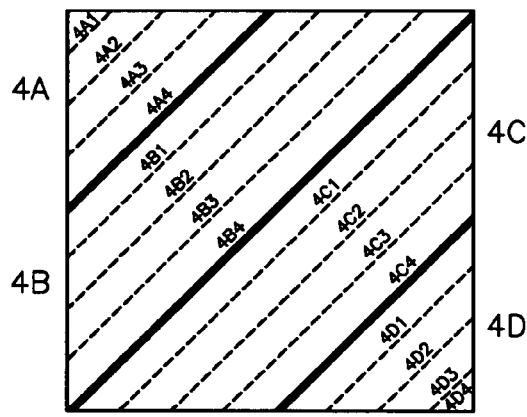
Figure 9E:
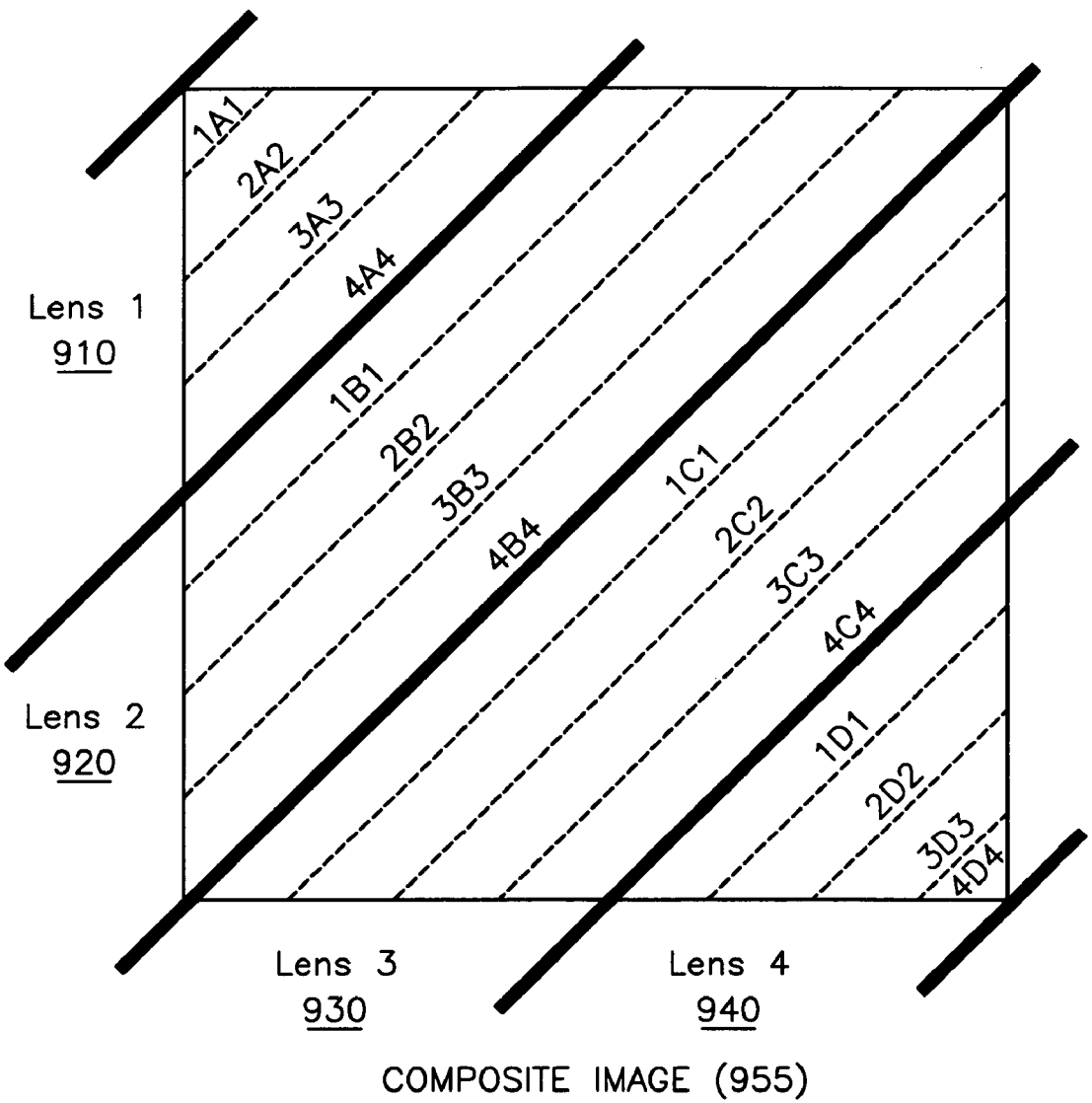
FIG. 9E is a diagrammatic elevational view of a composite image having tilted slices in accordance with the present invention, being generated from image data from each of the four images shown in FIGS. 9A through 9D.

Once these variable parameters (listed above) are set, the image data within each original image is rearranged into the proper format in the composite image so that it produces the desired effect when viewed through the tilted screen. For simplicity, this new rearrangement of image data is shown in FIG. 9E with only four original images 901-904, shown in FIGS. 9A-9D, and four cylinder lenses 910-940, although virtually any number can be used. The original images 901-904 are divided into sections (A,B,C, and D) that are parallel to the chosen lens or barrier angle. The number of sections is equal to the number of lenses or clear spaces (if barriers are used) to be used to view the composite image 955. The sections are further subdivided into sub-sections (the same number of sub-sections as there are original images). The data from one sub-section (1A1) of section 1A from original image 1 (901), for instance, is put into the composite image 955 in the sub-section space labeled 1A1 under lens 1 (910). If the resolution of the composite image 955 is to be the same as that of each of the original images (901-904) then the resolution of the data from section 1A of 901 (as well as that of all sections) is reduced (in this case by a factor of 4) in the direction perpendicular to the direction of the lenses or barriers. This is because only 4 sub-sections (equal to the number of original images in this example) from the 4 original images (one sub-section from each original image) are put under a single lens as sub-sections of the composite image 955. This means that sub-sections 1A2, 1A3, and 1A4 are discarded.

Similarly, data from sub-section 2A2 from original image 2 (902) is put in the composite image 955 in the sub-section space labeled 2A2. Sub-sections 2A1, 2A3, and 2A4 are discarded. A sub-section from each of the other sections of the original images is put into the composite image 955 as indicated. As little as one column of pixels, parallel to the lens or barrier direction, can be used from a sub-section. A different set of pixels could be selected from each original image's sections rather than the sub-sections stated (and preferred) herein above, without exceeding the scope and intention of the present invention, with similar results. Alternatively, as explained earlier herein, all of the data can be used if the image data is expanded (by duplication and/or interpolation) in the direction of the lenses or barriers, and if the resolution of the composite image in each direction is multiplied (by a factor of four in this example). The width of the Image Data Sets put into the composite image 955 is calculated as above, taking into account all parameters as explained above.

This set of rules for selection, duplication, interpolation, elimination, and rearrangement of the image data from the original images into the composite image defines a transformation or mapping of one set of image data into another. This mapping can be accomplished by computer or optically. These techniques can be used regardless of the angle chosen for the lenses or barriers of the image-directing device.

Using a computer, this mapping can be done quickly and efficiently. The usual way of scanning images, in a raster-like fashion, row after row, for instance, can be used to scan one original image at a time, for instance. The data can be placed in a memory buffer where the composite image will be built. As the data from each original image is read into the buffer line-by-line over time, each line of pixels can be read into the buffer and placed into the composite image without having to read the entire image into the buffer at one time to put it into the composite image.

Any or all data points, i.e. pixels, from the original image scan at any point in time during the reading of data along each row of an original image can be associated with their respective destination locations in the composite image, by software or hardware assignment, as the relationship never changes during the creation of any given composite image (once all variable parameters, discussed above, are determined). This way, only one of the original images, or even as little as one row at a time from an original image, plus the composite image, needs to be resident in memory at any one time, reducing memory necessary for processing, and speeding up the process of forming a composite image. Alternatively, all images may be resident in memory at the same time. Once the composite image is formed in memory, it can be output in many ways, such as by a digital optical printer or an ink jet printer onto photographic or plain paper, which is then registered with the image-directing device for viewing. It may alternatively be printed directly onto the back of the lenticular or barrier screen itself in registration for viewing. It can also be output onto printing plates for printing onto a material such as paper to be aligned with a screen or printed onto the screen itself. As mentioned above, it can also be displayed electronically.

The re-mapping of image data into the proper format in accordance with this invention can also be done optically in any of several ways. The original images can be produced in any way, such as by taking multiple pictures with a conventional camera and conventional film, or a CCD, for instance, or with a multi-lens camera. A common way to capture 3D data of a stationary scene is to put a camera on a track and take pictures from several different angles. A multi-lens camera can accomplish this in one shot. The preferred method of optically re-mapping the data from the original images into the final composite image uses negative images from the different original images to project onto positive reflective or transparency film. The negative images have to be reversed horizontally to provide an orthoscopic positive image, as is known in the art. The negative images can also be produced with a computer or digital or video cameras and printed in known ways, such as with a film recorder. Alternatively, the negative image can be displayed electronically, such as on a CRT, LCD, or Plasma screen, or with an electronic projection device, such as a micro-mirror or LCD projector.

Figure 10:
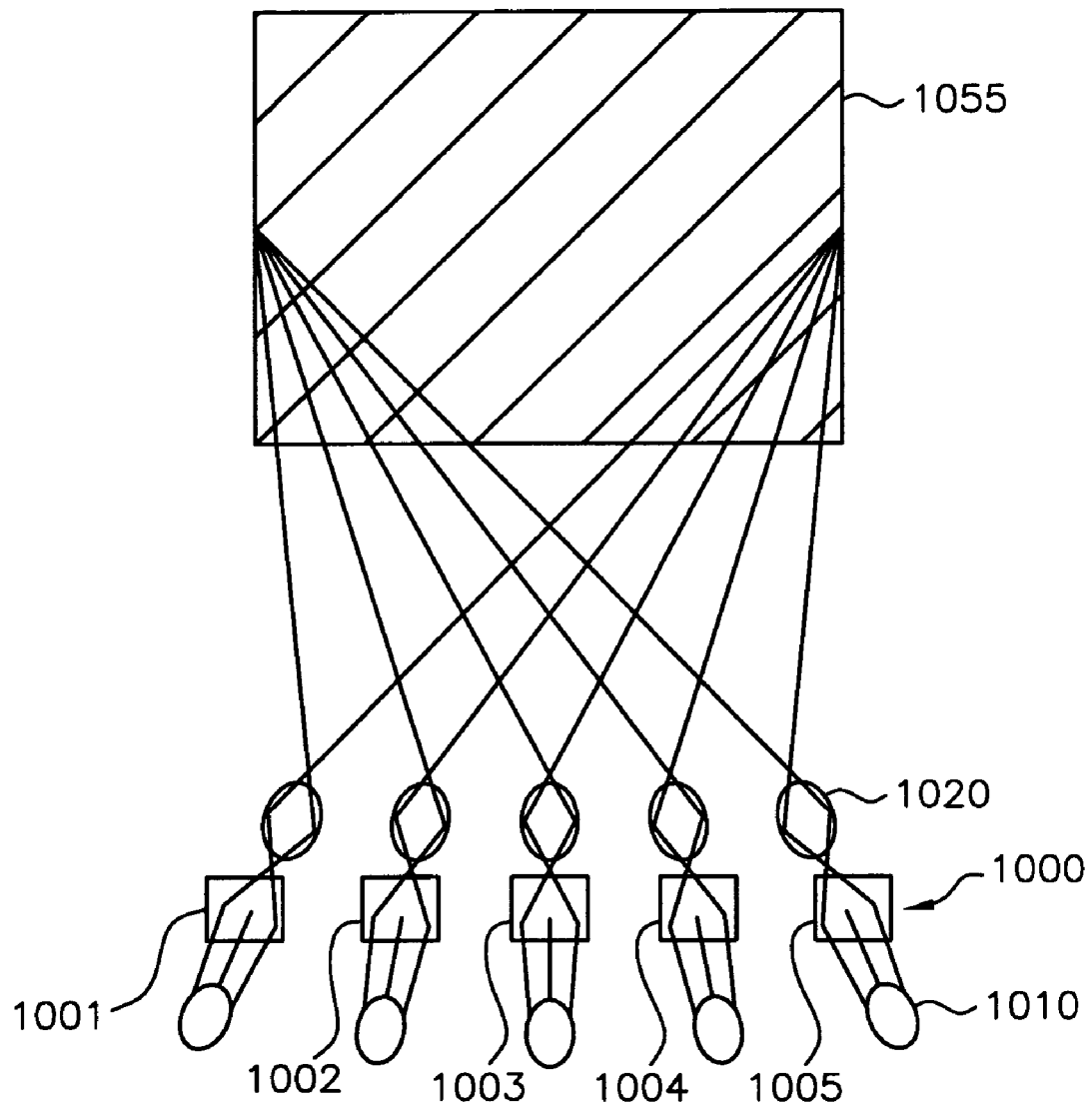
FIG. 10 is a diagrammatic perspective view showing image data from each of five original images 1000 being projected onto an image medium 1055 generating a composite image having tilted slices for recording.

The negative images 1000 are projected by lenses 1020, either sequentially or simultaneously, onto a positive emulsion on image medium 1055 through the screen as shown in FIG. 10. If projected sequentially, only one projection lens 1020 and light source 1010 need be used with the negative image sources 1000, all placed on a track system.

With this configuration, the single lens 1020 and single light source 1010 are used to project one image 1000 at a time onto the positive emulsion on image medium 1055, moving the lens and light source along the track, and even the emulsion, if desired, between exposures of different images 1000. The number of exposures made at different angles with the same image 1000 will determine the width of the viewing angle of each image on playback.

Only five images are shown for simplicity, although virtually any number of images can be used. The lenses 1020, negative images 1000, and the light sources 1010 illuminating the negative images 1000 can be progressively offset, as preferred and shown, so that a selected single element or object (such as a person or product of interest) from each negative image 1000 is superimposed on the final composite image on image medium 1055. Doing this will have the effect of making that image element appear sharply in the plane of the final composite image on image medium 1055, while other elements in the scene will appear in front of or behind that image element (if a 3D image is produced). The recorded image data on the image medium 1055 is covered by a lenticular or barrier screen at the selected angle after processing for image playback. Alternatively to placing an emulsion on image medium 1055 behind a screen for exposure, an emulsion can be coated on the back of the screen, for instance, with an anti-halation layer furthest from the lenticular or barrier screen. Alternatively, an emulsion can be coated on a clear plastic base with an anti-halation coating on top of the emulsion (farthest from the base). The clear plastic base can be placed adjacent to, or adhered to the lenticular or barrier screen. By adhering the emulsion to the screen, the emulsion can be processed while remaining in registration with the elements of the screen. This is preferred. The emulsion can also be processed separately, but then it is realigned with the screen once it is processed for proper viewing. When the light from the negative images 1000 passes through the angled lenticular or barrier screen, the images are automatically rearranged as they should be for proper viewing through the screen. When using a barrier screen, the screen is spaced from the image, a distance which depends on the intended optimum viewing distance, as explained hereinabove.

Alternative to using a screen that is tilted at a selected angle (other than vertical, assuming the projection lenses are disposed on a horizontal track), the screen can be left with its elements vertically oriented, while each negative is tilted at the selected angle. Another technique, which allows the negatives to be upright, but produces the same effect, is to tilt the camera(s) at the selected angle when the pictures are taken for the original images.

Another method is to use tilted lenses or barriers over the emulsion and tilting the track so it is perpendicular to the lenses or barriers. The images 1000 are then tilted as well, so that their vertical axes make an angle with the lenses or barriers equal to the final lens or barrier tilt angle.

With either of these last two described techniques, the final composite image is rotated so the composite image appears upright. Then the lenses or barriers will be tilted at the desired angle for viewing. The composite image would then preferably be cropped so that its sides are perpendicular to a horizontal plane (e.g. the floor) and its top and bottom are parallel to the floor.

Instead of imaging the data onto an emulsion through a lenticular lens, even if a lenticular lens is to be used for viewing, the preferred method is to image through a barrier screen, either placed in direct contact with the emulsion, or preferably, placed a distance from the emulsion. This way, aberrations, a consequence of using a lens, are eliminated in the recording phase, eliminating image information being recorded in the wrong places. This allows for a sharper image and reduces ghosting, increasing potential image depth with 3D and increasing the number of motion image frames that can be seen individually. This method also has the advantage of allowing the determination of angle of view and optimum viewing distance of the composite image independent of the projection lens characteristics and the actual distance between the projection lens and the composite image during exposure.

If the barrier screen is placed a distance from the emulsion, the images can be recorded sequentially or simultaneously, without the need for precise minute movement of the emulsion or the barrier screen, as they both remain stationary, preferably with collimated light. Once the images have been recorded through the barrier screen and processed, the composite image can be viewed through a barrier screen or lenticular lens screen, either of which can be adhered to the composite image either before or after the emulsion is exposed and processed. If the screen is adhered to the emulsion before exposure, exposure is made so as to align the recorded segments with the image-directing devices (e.g. barriers or lenses) used.

If the barrier screen is placed in direct contact with the emulsion, the various negative images cannot be imaged onto the composite image emulsion simultaneously. In this case, after the first negative image is imaged onto the emulsion, the emulsion or the barrier screen is moved parallel to the direction of the negative image displacement between images. For a 3D image, the negative images are horizontally displaced from each other, creating various horizontally displaced viewing positions so that each eye of a viewer sees a different image, creating a 3D experience. The emulsion or barrier screen is moved a distance, preferably equal to the width (in the direction of movement) of the previously exposed area of emulsion, to prevent overlap of recorded image data from successive images. Each image is recorded on the composite image emulsion in turn. The width of the clear lines in the barrier screen, Wcl, is made equal to Pbs/NI, where NI is the number of original images and the barrier screen pitch (Pbs) is the distance between the beginning of one clear line and the beginning of the next clear line (equal to Lp, the lens pitch as described above herein, when using lenses). The width of the opaque space (Wop) between clear lines is equal to Wcl*(NI−1). Once all NI images are exposed, no space will be left unexposed on the composite image, unless space is deliberately left between recorded lines to reduce cross-talk between images during playback, which will allow for more 3D depth, and more motion, with less ghosting. To introduce such a space between recorded image lines, black, clear, gray, colored, or other frames can be projected between successive negative image frames. In addition, or alternatively, the width of the clear spaces can be intentionally made smaller than Pbs/NI.

If negative emulsion is used to record the composite image instead of positive emulsion, the processed composite negative can be used to replicate many duplicate positive composite images by contact copying or by the use of an enlarger to make larger or smaller copies, which is viewed with the appropriately magnified or minified barrier or lenticular screen.

To further simplify production of finished composite images that are viewed through a barrier or lenticular lens screen but recorded either through a barrier screen, or by copying from a composite negative, the need for alignment and registration of the barrier or lenticular screen to the finished composite image can be eliminated. This can be done by first attaching an unexposed conventional emulsion to the barrier or lenticular screen to be used for viewing, with the normal anti-halation layer placed closest to the screen. An infra-red light source, such as a light-emitting diode (LED) or a laser, which doesn't expose the emulsion, is used to align a segment of the barrier or lenticular lens, near its edge, which doesn't have emulsion coated on it (allowing the light to be transmitted), with an alignment pattern on the edge of the barrier screen used for exposure ("exposure barrier") or on the composite negative image when contact copying is used). The alignment pattern on the exposure barrier screen or composite negative is preferably a pattern of clear and opaque lines adjacent to one another which are each about ⅓ to ½ the width of a single cylinder lens element of the lenticular screen or of a barrier space (as defined above) of the barrier screen to be used for viewing. At least three such lines should be affixed to or recorded on the surface of the exposure barrier which is immediately adjacent to the emulsion, or to the composite negative, in parallel to the barriers on the exposure barrier screen or to the data columns on the composite negative. Physically or electronically looking through the barrier or lenticular lens to be used for viewing at the alignment pattern will show whether or not the alignment pattern is aligned with the barriers or lenses. The exposure barrier or composite negative, for instance, can then be shifted or rotated manually or automatically to align it with the barriers or lenses to be used for viewing. Once they are aligned, the visible light exposure can be made onto the emulsion (not passing through the barrier or lenticular lens to be used for viewing), assuring that the composite image pattern being exposed will be in register with the already attached barrier or lenticular lens to be used for viewing. The emulsion, with barrier or lenticular lens already attached in registration, can then be processed for final viewing through the barrier or lenticular lens.

Figure 11:
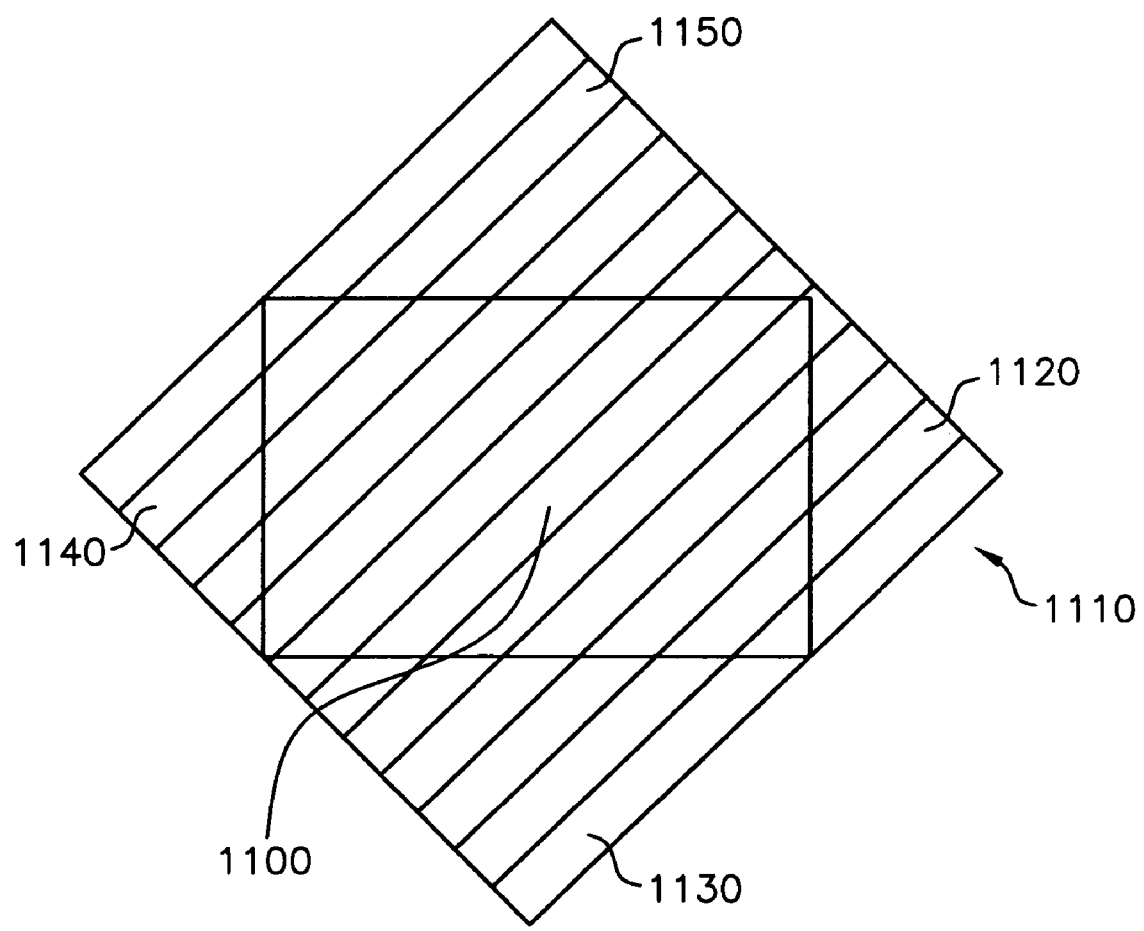
FIG. 11 is a diagrammatic elevation view showing how a sheet of an image-directing device having tilted light-directing elements can be made from a sheet of conventional lenticular or barrier material, by cutting as shown and discarding the triangular waste portions.

Lenticular lens and barrier screens have been made for decades. The lenses or barriers have all been parallel to the vertical or horizontal edges of the screens, whether they are made in sheets or on continuous rolls. While this is fine for viewing images whose pixel columns within the Image Data Sets (the "Data Lines") are recorded at zero or ninety degrees, their use with images whose Data Lines are oriented at other angles would be wasteful. This is illustrated in FIG. 11. Image 1100 is a composite image made, as described herein, with its Data Lines not oriented at zero or ninety degrees, requiring a lenticular lens or barrier screen placed over it for viewing whose lenses or barriers are also not oriented at zero or ninety degrees. A conventional screen 1110 is placed over it at the necessary angle for proper viewing. Areas 1120, 1130, 1140, and 1150 are not used by the image and are cut off and discarded, using extra labor and wasting material for each image. To eliminate this problem, lenticular and barrier screens can be made with their barriers or lenses at the necessary angle to the edges of the screen to eliminate this extra waste and expense.

For barrier screens, this can be done in a number of ways. These various methods produce a new type of barrier screen, not produced before, which can be used with a composite image (such as those described in this patent) whose data lines are oriented at any angle, without material waste. First the pitch of the "barrier space" (Pbs), the opaque space width (Wop), and the width of the clear space (Wcl) are determined, as defined herein. As mentioned above, the ratio of the clear space width (Wcl) to opaque space width (Wop) is typically based on the number of original images used, with Wcl=Pbs/NI and Wop=Wcl*(NI−1). However, with this ratio of clear to opaque space, only very narrow viewing positions (the number of positions being equal to NI) will provide each eye with a single image. Most positions will provide ghosting since part of each of every two adjacent images will always be visible through the clear areas at most viewing positions. By reducing the ratio of Wcl/Wop, which, in the prior art, is ((1/NI)*Pbs)/(((NI−1)/NI)*Pbs), more of the viewing area will provide the view of a single image at a time, decreasing ghosting, increasing depth potential, and reducing motion blurring. The preferred method of production is to produce the selected pattern, to scale, using appropriately spaced black and white columns or rows of pixels in a graphics program such as Adobe Photoshop®. The barrier screen pattern is then tilted with the program (if needed) to the desired angle. Then the image is cropped on all four sides so that the sides are once again made parallel and perpendicular to the horizon (parallel to the edges of the computer screen). Then the pattern can be printed on a transparent substrate for placement on a composite image.

Alternatively, groves can be made at the desired angle into a clear substrate (e.g. a plastic plate) by a (preferably computer-controlled) spinning drill or router bit, a scribing tool, a diamond tipped tool, a laser cutter, or other tool. Since the opaque areas are larger than the clear areas, the tool can preferably be used to produce the opaque areas. Once all grooves are made, an opaque substance, such as ink or paint, can cover the surface. Then, using doctor blading, the opaque material can be wiped off the thinner, higher, non-grooved areas, producing the barrier grid at the desired angle. Alternatively, the clear substrate can first be coated evenly with an opaque coating and then grooves can be similarly produced to eliminate the coating in selected lines to produce the clear areas. Alternatively, the pattern can be made into a plate having as its surface a soft material, such as copper, beryllium copper, or plastic, which can be used to make a hard master mold, in a material such as nickel, which can be used to make copies of the pattern in a soft material, such as plastic (punching slots into the material corresponding to the clear spaces). Another method is to use a laser beam and scan lines onto an emulsion, placed on a flat surface or on a drum, to produce the grid. Still another method is to expose an emulsion to the interference pattern produced in an interferometer. By using a micrometer adjustment to move one or more components (the emulsion and/or one or more of the mirrors), the pattern can be shifted laterally (perpendicular to the fringes) to expose more and more of the emulsion, leaving only very thin unexposed lines to become the clear areas. Yet another method of producing the grid is to use the arrangement of FIG. 10 wherein all negative images 1000 are opaque, except for one, which is clear (or vice versa). The lenticular lens on the emulsion on image medium 1055 can be placed at the desired orientation for exposure, or can be exposed with the lenses vertically oriented and then cut at the required angle after processing. Whichever method is used to produce a grid wherein the lines are at the desired orientation with respect to the sides, copies can be made quickly and inexpensively by contact printing onto an emulsion.

The preferred method of producing a lenticular lens, wherein the lenses are at a desired orientation with respect to the sides, requires the use of a hard tool, such as a diamond-tipped tool, whose surface has been machined and polished with the desired radius of curvature. This tool can be used to produce grooves, at the desired orientation, in a sheet of soft material (as outlined above for the production of a barrier screen), referred to here as the "soft master", under computer control. The sheet can be lying flat and it, or the tool, or both, can move to make the necessary grooves. The soft master can then be used to make a hard copy (such as in nickel) by electroplating. This hard copy (referred to as the "mother") can be used to make several other hard copies (called "daughters") by electroplating and separation. The daughters have grooves in them, like the original soft masters, whereas each mother has bumps instead of grooves. The daughters can be used to produce lenticular lenses by compression or injection molding, or embossing, of plastic, for instance.

Alternative to making mothers and daughters, the soft master can be coated with hard material, such as nickel or chrome, and be used to produce lenticular lenses directly. The preferred method of mass-producing such lenses at the lowest cost and highest speed utilizes a drum with the hardened soft master or daughter wrapped around it. This way, instead of producing one lenticular screen at a time, a continuous roll of lenticular material can be produced. Like with the plate, copying is done into a deformable material such as thermoplastic.

Common thermoplastics that can be used for this purpose include for example: amorphous polyethylene terephthalate (APET), polyethylene terephthalate glycol (PETG), acrylic, polyesters such as Eastar copolyester A150, polyvinyl chloride (PVC) and polycarbonate. Heat and pressure cause the deformable material to take on the shape of cylinder lenses on its surface. Preferably, the material is heated to its softening point before contacting the drum, or the drum with master or daughter around it is heated to a sufficient temperature to deform the deformable material at the area where the deformable material first comes in contact with the drum. Also, preferably, the material stays in contact with the drum as it turns, with that part of the drum being cooled rapidly, by cold water for instance, running through it. Once cooled and sufficiently hardened, the material arrives at a point close to the area where it first came into contact with the drum and it is pulled off the drum to wind on a take-up roll.

Figure 12:
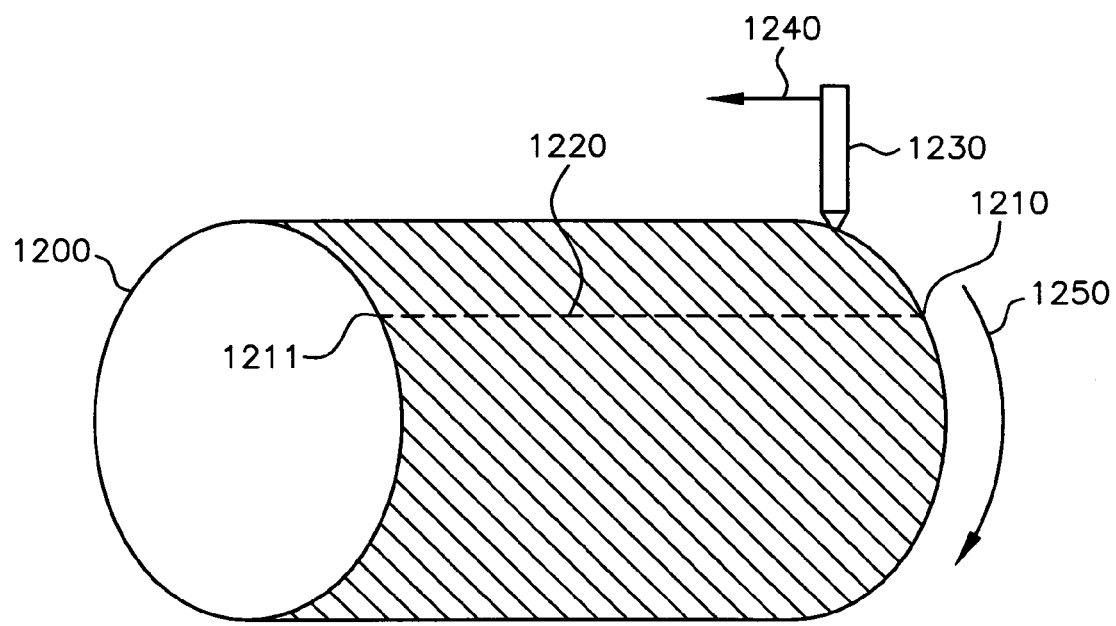
FIG. 12 is a perspective view of a device for scoring a cylindrical master drum that can be used for producing lenticular or barrier sheets having tilted lenticular or barrier elements in accordance with the invention.

Extrusion or embossing can also be similarly used to produce the continuous roll of lenticular material. The difference is that extrusion pushes nearly-liquid material through a slot which has a flat straight opening close to the rotating drum to produce a flat smooth surface on the side of the material opposite the lens surface. Instead of producing a flat master or daughter and wrapping it around a drum (which would have a seam), it is preferable to make the grooves directly on the drum, so there is no seam. This can be better understood with reference to FIG. 12. Drum 1200 has grooves in it at the desired angle with respect to the sides. The grooves are made by an engraving tool 1230, diamond-tipped for instance, as it moves in a direction indicated by arrow 1240, parallel to the drum axis, while the drum rotates about its axis, as indicated by arrow 1250. The speeds of rotation of the drum and movement of the tool are carefully coordinated so that the grooves stay straight, with a constant slope, and at the desired angle to the edge of the drum. Proper regulation of those speeds will allow for the making of grooves at any desired angle to the sides of the drum; from straight across the drum, requiring the drum to stay motionless while the tool goes from one side of the drum to the other, then (with the tool off the drum) rotating the drum just enough for the tool to be able to make the next groove (the rotation amount determining the lens pitch (Lp)), and so on, to parallel to the sides of the drum, requiring the tool to remain motionless while the drum rotates a full rotation to make a single groove, then the tool comes off the drum, moves over a distance equal to Lp, and then makes the next groove, and so on, or any lens angle in-between.

For example, drum 1200 is shown having its circumference equal to its width, although this relationship is not necessary. In this case, to make lenses at forty-five degrees, for instance, the speeds are regulated so that the tool 1230 starting at point 1210, for instance, ends up at point 1211 after one full drum rotation in this example, with point 1211 being straight across from point 1210, as indicated by dashed line 1220, which is parallel to the drum's axis.

In the foregoing examples, a tool makes contact with the edge of the drum and moves across the drum at some velocity Vt as the drum rotates at an angular velocity Vd. At a particular velocity, depending on the width of the tool, and thus the width the lenslets will have, the spiral groove formed will consist of grooves next to one another, with virtually no space in between grooves. This will result in a lens array with a slight tilt angle. Increasing the tool travel speed Vt with respect to Vd will eventually result in a speed which, when used to groove the cylinder, will produce grooves with a space between them equal to the width of one groove. In this case the process is to be repeated again to fill in a groove between the existing grooves by starting the process again with the tool at the end of the cylinder at the space between the first groove as it goes around the cylinder and the next revolution's groove. After the second engraving, the cylinder will have grooves over its surface, again with virtually no spaces between grooves, but at a steeper angle than before. By increasing the speed of Vt in relation to Vd, larger and larger spaces will be left between grooves to be filled in later by successive re-engravings of the cylinder, starting at different starting points along the edge of the cylinder each time, to fill in all spaces with grooves, resulting in steeper and steeper groove (and thus lenslet) angles. The increases in Vt are chosen with specific increased numbers to always provide a space between grooves which is evenly divisible by a groove's width, so there is no overlap nor spaces left between grooves.

This method of making lenticular lenses, never done before, will produce lenses at any desired angle to the edges of the lenticular screen produced, which can be used with any composite image, such as those described in this patent, without any waste.

INDUSTRIAL APPLICABILITY

Various examples of the uses of an image display device of the present invention are mentioned hereinabove, including: presenting a moving or animated or flip image, a 3D scene, different frames of a movie, video, or animation, different images on a chosen topic such as a product and its price, before-and-after pictures, or other images the creator of the picture wants the viewer to see. Such image displays have similar uses as conventional lenticular or barrier sheet image displays, as well as enhanced attractiveness for charge cards, product pictures, promotional mailings, posters, as well as electronically displayed images.

What is claimed is:

1. An image display comprising
(a) an image medium providing a viewing surface, and
(b) an image-directing device,
wherein the viewing surface shows a composite image having horizontal and vertical axes and being composed of parallel slices of image data derived from two or more original images, co-mingled to form one image whose slices are tilted so as not to parallel either the horizontal or vertical axis of the composite image; when it is viewed as intended, and
wherein the image-directing device comprises elements of a lenticular lens array or a barrier screen that are tilted to parallel the slices of the composite image, which causes the two or more original images to be visible, each from different viewing positions, wherein the composite and original images are broken down into sections and subsections, and image data from the original image subsections is put into selected sub-sections of the composite image according to a set of mapping rules, such that essentially the same sequence of images is displayed to a viewer, regardless of whether the viewing surface of the image medium containing composite image data is tipped relative to a viewer about a horizontal or a vertical axis as the viewer watches.

2. An image display comprising an image medium providing a viewing surface, and an image-directing device, wherein the viewing surface shows a composite image having horizontal and vertical axes and being composed of parallel slices of image data derived from two or more original images, and the image-directing device comprises elements that parallel the slices of the composite image, characterized in that:
(a) the parallel slices of the composite image are tilted so as not to parallel either the horizontal or vertical axes thereof; and
(b) the elements of the image-directing device are correspondingly tilted,
whereby the display provides essentially the same desired effect when the image surface is tipped, regardless of whether it is tipped about a horizontal or vertical axis.

3. An image display of claim 1 or 2, wherein the image-directing device is a lenticular screen comprising a multiplicity of lenticules.

4. An image display of claim 3, wherein the lenticules are cylindrical lenses.

5. An image display of claim 1 or 2, wherein the image-directing device is a barrier screen comprising a substrate having linear boundaries, the substrate having a pattern of barrier lines providing openings therein that are parallel to each other and not parallel to a boundary of the substrate.

6. An image display of claim 1 or 2, wherein the image-directing device is a lenticular screen comprising a substrate having linear boundaries, the substrate being formed into lenticules that are parallel to each other and not parallel to a boundary of the substrate.

7. An image display of claim 1 or 2, wherein the image-directing device was produced by the steps of:
(a) providing a forming tool comprising a cylinder having spiral grooves embossed on a hard surface;
(b) employing the forming tool to form an image-directing device as a rectangular sheet having elements that do not parallel any boundary of the sheet.

8. The image display of claim 7, wherein step (b) of producing the image-directing device is performed by
(a) providing a soft, formable substrate of transparent material having a desired refractive index; and
(b) contacting the soft, formable substrate with the hard surface so as to form the substrate into an array of lenticules that do not parallel any boundary of the sheet.

9. The image display of claim 7, wherein step (b) of producing the image-directing device is performed by
(a) providing a soft, formable substrate of opaque material; and
(b) contacting the soft, formable substrate with the hard surface so as to form in the substrate an array of parallel linear slits that do not parallel any boundary of the sheet.

10. An image display of claim 1 or 2, which has been produced by selecting images and parameters so that when it is tipped about a horizontal axis or a vertical axis, a viewer sees a 3D image with horizontal parallax.

11. An image display of claim 1 or 2, which has been produced by selecting images and parameters so that when it is tipped about a horizontal axis or a vertical axis, a viewer sees a moving image or animation or flip.

12. An image display of claim 1 or 2, which has been produced by selecting images and parameters so that when it is tipped about a horizontal axis or a vertical axis, a viewer sees a moving or animated or flip 3D image.

13. An image display of claim 1 or 2 that has parameters selected so that the display
(a) produces a desired effect selected from the group consisting of 3D, motion, zoom, morphing, and image-flipping,
(b) provides a viewing angle of at least 65 degrees, without increasing perception of undesired discontinuity or aberrations or the individual elements of the image-directing device.

14. An image display of claim 1 or 2, wherein the image medium is an electronic display.

15. An image display of claim 14, wherein the electronic display is a cathode ray tube, liquid crystal display, plasma screen display, or projection display.

16. A method of production of at least one of a lenticular lens screen and a barrier screen by replication from a flat plate that has grooves in it that are not parallel to the sides of the plate.

17. The image display of claim 1, in which the image-directing device comprises a substrate of a thermoplastic selected from the group consisting of amorphous polyethylene terephthalate, polyethylene terephthalate glycol acrylic, polyester, polyvinyl chloride, and polycarbonate.

18. The image display of claim 1, which shows at least one effect from the group consisting of 3D, motion, zoom, morphing, and image-flipping, wherein said composite image was generated from two or more original images by interpolation, wherein the height of the final composite image is a function of the number of original images used to form the composite image, and wherein for three initial images, the composite image is expanded by a factor of three, and wherein such an interpolation is performed by image-processing software, using an "image size" function with the option of nearest-neighbor sampling.

19. The image display of claim 1, which shows at least one effect from the group consisting of 3D, motion, zoom, morphing, and image-flipping, wherein said composite image was generated from two or more original images by interpolation, wherein the height of the final composite image is a function of the number of original images used to form the composite image, and wherein for three initial images, the composite image is expanded by a factor of three, and wherein such an interpolation is performed by image-processing software, using an "image size" function with the option of bilinear sampling.

20. The image display of claim 1, which shows at least one effect from the group consisting of 3D, motion, zoom, morphing, and image-flipping, wherein said composite image was generated from two or more original images by bicubic interpolation, wherein the height of the final composite image is a function of the number of original images used to form the composite image, and wherein for three initial images, the composite image is expanded by a factor of three, and wherein such an interpolation is performed by image-processing software, using an "image size" function with the option of bicubic interpolation.

21. An image display of claim 1 or 2 further comprising a sheet or roll of lenticular lens material, produced by applying the grooved surface of a metal drum which has grooves in its surface that spiral around the drum, not being parallel to the edges of the drum, to a plastic material from which the lenticular lens material is to be formed, so that the lenticular lens material produced by such application thereby has its lenticules other than parallel to the edges of the sheet or roll of lenticular lens material.

22. The image display of claim 21, wherein the grooved surface of the metal drum is applied to the plastic material by embossing or extrusion.

23. A method of producing a composite image which shows at least one effect from the group consisting of 3D, motion, zoom, morphing, and image-flipping, that is intended to be displayed on a viewing surface of an image medium which is viewed through an image-directing device having a multiplicity of parallel elements, comprising:
  (a) partitioning two or more original images, each image having rectangular boundaries, into sections and sub-sections, thereby forming slices which do not parallel any of the boundaries;
  (b) selecting data from said sub-sections, rearranging said selected data into an arrangement forming sections and sub-sections of a composite image;
wherein the sections and sub-sections are slices which parallel each other but do not parallel any of the boundaries of the composite image, and wherein the elements of the image-directing device are not parallel to the horizontal or the vertical axis of the composite image and wherein motion of the viewer in a horizontal or vertical direction with respect to the composite image or tipping of the image about a horizontal or vertical axis, displays essentially the same visual effects.

24. The method of claim 23, wherein the aspect ratio is preserved by generating pixels by interpolation from data relating to each original image without discarding image data.

25. The method of claim 23, performed by computer means having a memory buffer, wherein only the composite image and one original image is in a memory buffer at any one time.

26. The method of claim 23, performed by computer means having a memory buffer, wherein only the composite image and less than all of the lines of data of one original image is in a memory buffer at any one time.

27. A method of producing a composite image which shows at least one effect from the group consisting of 3D, motion, zoom, morphing, and image-flipping, that is intended to be displayed on a viewing surface of an image medium which is viewed through an image-directing device adapted to be displayed in a location and orientation that is generally upright with respect to the floor, the image-directing device having a multiplicity of parallel elements, comprising:
  (a) partitioning two or more original images, each image having rectangular boundaries, into sections and sub-sections, thereby forming slices which do not parallel any of the boundaries; and
  (b) selecting data from said sub-sections, rearranging said selected data into an arrangement forming sections and sub-sections of a composite image;
wherein the sections and sub-sections are slices which parallel each other but are not parallel or perpendicular to the floor when the image is seen as generally upright, and wherein the elements of the image-directing device are not parallel to the horizontal or the vertical axis of the composite image and wherein motion of the viewer in a horizontal or vertical direction with respect to the composite image or tipping of the image about a horizontal or vertical axis, displays essentially the same visual effects.

28. A method of producing a composite image for use in an image display comprising an image medium providing a viewing surface, and an image-directing device, wherein the viewing surface shows a composite image having horizontal and vertical axes and being composed of parallel slices of image data derived from two or more original images, and the image-directing device comprises elements that parallel the slices of the composite image, characterized in that:
  the parallel slices of the composite image are tilted so as not to parallel either
  the horizontal or vertical axes thereof; and
  the elements of the image-directing device are correspondingly tilted, whereby the display provides essentially the same desired effect when the image surface is tipped, regardless of whether it is tipped about a horizontal or vertical axis which shows at least one effect from the group consisting of 3D, motion, zoom, morphing, and image-flipping, the method comprising the steps of:
  a. selecting a tilt angle for the elements of the image-directing device;
  b. selecting the number of original images to be used;
  c. selecting the composite image size;
  d. selecting the number of elements to use in the image-directing device, thereby determining their pitch;
  e. selecting a substrate material for the image-directing device;
  f. selecting the optimum viewing distance;
  g. selecting the thickness of the image-directing device;
  h. selecting the viewing angle of the image-directing device;
  i. determining image data set width; and
  j. rearranging image data from two or more original images into parallel rows or columns according to a pre-determined layout and mapping arrangement utilizing the parameters determined and selected in the aforesaid steps, including the use of means to preserve the aspect ratio of the composite image, by at least one of computer and optical means.

29. A method of generating a composite image which shows at least one effect selected from the group consisting of 3D, motion, zoom, morphing, and image-flipping, suitable for display via an image display comprising an image medium providing a viewing surface, and an image-directing device consisting of at least one of a barrier screen and a lenticular screen, wherein the viewing surface shows a composite image having horizontal and vertical axes and being composed of parallel slices of image data derived from two or more original images, wherein motion of the viewer in a horizontal or vertical direction with respect to the composite image or tipping of the image about a horizontal or vertical axis, displays essentially the same visual effects, comprising the step of:
  remapping image data from two or more original images into a composite image by optical means, and wherein the image-directing device comprises elements that parallel the slices of the composite image and the elements of the image-directing device are not parallel to the horizontal or the vertical axis of the composite image.

30. A method of claim 29, wherein the original images are made to overlap onto the composite image such that one selected feature in each original image is made to coincide exactly with each other in the composite image.

31. A method of claim 29, wherein an emulsion is coated on the back of at least one of a barrier screen and a lenticular screen with the anti-halation layer being the layer furthest from said screen and exposing the emulsion through said screen.

32. A method of claim 29, wherein an emulsion is coated on the back of at least one of a barrier screen and a lenticular screen with the anti-halation layer being the layer closest to said screen and exposing the emulsion directly and not through said screen.

33. A method of claim 29, wherein the original images are tilted at a selected angle corresponding to the tilt angle of at least one of a lenticular lens array and a barrier screen to be used to view the composite image.

34. A method of claim 29, wherein the original images are generated at an angle corresponding to the tilt angle of at least one of a lenticular lens array and a barrier screen to be used to view the composite image.

35. A method of claim 29, wherein the images are projected through a barrier screen onto an emulsion in registration with a lenticular lens array attached to the emulsion.

36. A method of claim 29, wherein the composite image is contact copied onto an emulsion in registration with an image-directing device attached to the emulsion.

37. A method of claim 29, wherein the image-directing device is a barrier screen having clear spaces whose width (Wcl) is less than Pbs/NI, where Wcl is the width of each clear space between adjacent opaque barriers in the barrier screen, Pbs is the pitch of the barrier spaces equal to the distance between adjacent clear spaces in the barrier screen, and NI is the number of original images.

38. A method of claim 29, wherein the images are projected through a barrier screen onto a substrate having a recording emulsion coated thereon, and wherein the barrier screen is in contact with the recording emulsion and is shifted over for each exposure during a process of making multiple exposures.

39. A method of claim 29, wherein the images are projected through a barrier screen onto a substrate having a recording emulsion coated thereon, wherein the barrier screen is separated from contact with the recording emulsion and there is no relative motion between the barrier screen and the emulsion during a process of making multiple exposures.

40. A method of claim 29, wherein the remapping of image data from two or more original images into a composite image by optical means comprise projection of the images through an image-directing device wherein each of the two or more original images makes its own individual exposure after passing through the image-directing device, thereby recording multiple exposures.

41. A method of producing a barrier screen comprising a substrate having linear boundaries, the substrate having a pattern of barrier lines providing openings therein that are parallel to each other and not parallel to a boundary of the substrate, the method comprising the following steps:
  a. producing the selected pattern to scale, using appropriately spaced black and white columns or rows of pixels in a graphics program;
  b. tilting the barrier screen pattern with the program to the desired angle;
  c. cropping the image on all four sides so that the sides are once again made parallel and perpendicular to the horizon, i.e. horizontal axis which is parallel to the edges of the computer screen;
  d. printing the pattern on a transparent thermoplastic substrate for placement on a composite image.

42. A method of producing a barrier screen comprising a substrate having linear boundaries, the substrate having a pattern of barrier lines providing openings therein that are parallel to each other and not parallel to a boundary of the substrate, the method comprising the following steps:
  a) make groves at the desired angle into a clear substrate of thermoplastic by a tool selected from the group consisting of a computer-controlled spinning drill, a router bit, a scribing tool, a diamond tipped tool, a laser cutter;
  b) tool is used to produce the opaque areas because the opaque areas are larger than the clear areas;
  c) an opaque substance is then applied to cover the surface;
  d) the opaque material is removed from the thinner, higher, non-grooved areas, thereby producing a barrier grid having openings tilted at the desired angle.

43. A method of production of barrier screen comprising a substrate having linear boundaries, the substrate having a pattern of barrier lines providing openings therein that are parallel to each other and not parallel to a boundary of the substrate, the method wherein a laser beam is used to scan lines onto an emulsion, placed on a flat surface or on a drum, to produce the barrier grid.

44. A method of production of barrier screen comprising a substrate having linear boundaries, the substrate having a pattern of barrier lines providing openings therein that are parallel to each other and not parallel to a boundary of the substrate, the method wherein
  an emulsion is exposed to the interference pattern produced in an interferometer comprising a plurality of mirrors producing a pattern of interference fringes;
  using a micrometer adjustment, one or more components, namely the emulsion and one or more of the mirrors, is moved precisely to shift the pattern laterally, namely perpendicular to the fringes, to expose more and more of the emulsion, leaving only very thin unexposed lines to become the clear areas.

* * * * *